United States Patent
Poon et al.

(10) Patent No.: US 8,275,673 B1
(45) Date of Patent: Sep. 25, 2012

(54) METHOD AND SYSTEM TO RECOMMEND FURTHER ITEMS TO A USER OF A NETWORK-BASED TRANSACTION FACILITY UPON UNSUCCESSFUL TRANSACTING WITH RESPECT TO AN ITEM

(75) Inventors: Alex Poon, Los Altos Hills, CA (US); Reed Maltzman, San Francisco, CA (US); Jeffrey Taylor, Los Altos, CA (US)

(73) Assignee: eBay Inc., San Jose, CA (US)

( * ) Notice: Subject to any disclaimer, the term of this patent is extended or adjusted under 35 U.S.C. 154(b) by 1792 days.

(21) Appl. No.: 10/263,224

(22) Filed: Oct. 1, 2002

Related U.S. Application Data

(60) Provisional application No. 60/373,525, filed on Apr. 17, 2002.

(51) Int. Cl.
*G06Q 30/00* (2006.01)

(52) U.S. Cl. ............... 705/26.7; 705/26.3; 705/27.1; 705/37

(58) Field of Classification Search .......... 705/26–27, 705/37
See application file for complete search history.

(56) References Cited

U.S. PATENT DOCUMENTS

| | | | |
|---|---|---|---|
| 4,996,642 A | 2/1991 | Hey | |
| 5,310,997 A * | 5/1994 | Roach et al. ............... | 235/375 |
| 5,583,763 A | 12/1996 | Atcheson et al. | |
| 5,749,081 A | 5/1998 | Whiteis | |
| 5,790,426 A | 8/1998 | Robinson | |
| 5,790,790 A | 8/1998 | Smith et al. | |
| 5,825,881 A | 10/1998 | Colvin | |
| 5,842,199 A | 11/1998 | Miller et al. | |
| 5,845,265 A | 12/1998 | Woolston et al. | |
| 5,897,622 A | 4/1999 | Blinn et al. | |
| 6,016,475 A | 1/2000 | Miller et al. | |
| 6,041,311 A | 3/2000 | Chislenko et al. | |
| 6,047,264 A | 4/2000 | Fisher et al. | |
| 6,049,777 A | 4/2000 | Sheena et al. | |
| 6,055,513 A | 4/2000 | Katz et al. | |
| 6,061,448 A | 5/2000 | Smith et al. | |
| 6,064,980 A | 5/2000 | Jacobi et al. | |
| 6,085,176 A | 7/2000 | Woolston et al. | |

(Continued)

FOREIGN PATENT DOCUMENTS

EP 0957437 11/1999

(Continued)

OTHER PUBLICATIONS

Ansari, Asim et al.; "Internet Recommendation Systems," Journal of Marketing Research, Aug. 2000, v37n3pg363, Proquest #57914570, 13pgs.*

(Continued)

*Primary Examiner* — Robert M. Pond
(74) *Attorney, Agent, or Firm* — Schwegman Lundberg & Woessner, P.A.

(57) ABSTRACT

A method and an apparatus for communicating a recommended item to a user of a network-based transaction facility are described. The method comprises determining that the user has been unsuccessful in concluding a transaction pertaining to an item offered for sale via the network-based transaction facility, and, in response to this determination, communicating information concerning a recommended item to the user over a network. The recommended item is available for purchase via the network-based transaction facility.

19 Claims, 13 Drawing Sheets

U.S. PATENT DOCUMENTS

| | | | |
|---|---|---|---|
| 6,085,229 | A | 7/2000 | Newman et al. |
| 6,092,049 | A | 7/2000 | Chislenko et al. |
| 6,101,484 | A | 8/2000 | Halbert et al. |
| 6,101,486 | A | 8/2000 | Roberts et al. |
| 6,108,493 | A | 8/2000 | Miller et al. |
| 6,119,101 | A | 9/2000 | Peckover et al. |
| 6,119,137 | A | 9/2000 | Smith et al. |
| 6,169,986 | B1 | 1/2001 | Bowman et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 | 6/2001 | Fisher |
| 6,246,997 | B1 | 6/2001 | Cybul et al. |
| 6,266,649 | B1 | 7/2001 | Linden et al. |
| 6,308,168 | B1 | 10/2001 | Dovich et al. |
| 6,313,745 | B1 | 11/2001 | Suzuki |
| 6,317,722 | B1 | 11/2001 | Jacobi et al. |
| 6,321,221 | B1 | 11/2001 | Bieganski |
| 6,334,127 | B1 | 12/2001 | Bieganski et al. |
| 6,356,879 | B2 | 3/2002 | Aggarwal et al. |
| 6,360,216 | B1 | 3/2002 | Hennessey et al. |
| 6,370,513 | B1 | 4/2002 | Kolawa et al. |
| 6,412,012 | B1 | 6/2002 | Bieganski et al. |
| 6,415,270 | B1 * | 7/2002 | Rackson et al. ............ 705/36 R |
| 6,466,918 | B1 | 10/2002 | Spiegel et al. |
| 6,484,149 | B1 | 11/2002 | Jammes et al. |
| 6,487,539 | B1 | 11/2002 | Aggarwal et al. |
| 6,499,029 | B1 | 12/2002 | Kurapati et al. |
| 6,587,838 | B1 | 7/2003 | Esposito et al. |
| 6,615,247 | B1 | 9/2003 | Murphy |
| 6,636,836 | B1 | 10/2003 | Pyo |
| 6,772,150 | B1 | 8/2004 | Whitman et al. |
| 6,785,671 | B1 | 8/2004 | Bailey et al. |
| 6,801,909 | B2 | 10/2004 | Delgado et al. |
| 6,813,775 | B1 | 11/2004 | Finseth et al. |
| 6,853,982 | B2 | 2/2005 | Smith et al. |
| 6,865,546 | B1 | 3/2005 | Song |
| 6,963,850 | B1 | 11/2005 | Bezos et al. |
| 7,016,863 | B1 | 3/2006 | Kamakura et al. |
| 7,831,476 | B2 | 11/2010 | Foster et al. |
| 2001/0021914 | A1 | 9/2001 | Jacobi et al. |
| 2001/0021921 | A1 | 9/2001 | Kan et al. |
| 2001/0034662 | A1 | 10/2001 | Morris |
| 2001/0037255 | A1 | 11/2001 | Tambay et al. |
| 2001/0037259 | A1 | 11/2001 | Sharma et al. |
| 2001/0044758 | A1 | 11/2001 | Talib et al. |
| 2001/0054021 | A1 * | 12/2001 | Kawakura et al. ............... 705/37 |
| 2001/0056395 | A1 * | 12/2001 | Khan ............................. 705/37 |
| 2002/0022994 | A1 | 2/2002 | Miller et al. |
| 2002/0026386 | A1 | 2/2002 | Walden |
| 2002/0052873 | A1 | 5/2002 | Delgado et al. |
| 2002/0055890 | A1 | 5/2002 | Foley |
| 2002/0059116 | A1 | 5/2002 | Bulatovic et al. |
| 2002/0062268 | A1 | 5/2002 | Sato et al. |
| 2002/0065760 | A1 * | 5/2002 | Wiesehuegel et al. .......... 705/37 |
| 2002/0065877 | A1 | 5/2002 | Kowtko et al. |
| 2002/0099629 | A1 | 7/2002 | Sato et al. |
| 2002/0103692 | A1 | 8/2002 | Rosenberg et al. |
| 2002/0138331 | A1 | 9/2002 | Hosea et al. |
| 2002/0143660 | A1 | 10/2002 | Himmel et al. |
| 2002/0147628 | A1 | 10/2002 | Specter et al. |
| 2002/0156686 | A1 | 10/2002 | Kraft et al. |
| 2002/0161664 | A1 | 10/2002 | Shaya et al. |
| 2002/0174428 | A1 | 11/2002 | Agnihotri et al. |
| 2002/0184116 | A1 | 12/2002 | Tam et al. |
| 2002/0198882 | A1 | 12/2002 | Linden et al. |
| 2003/0028427 | A1 | 2/2003 | Dutta et al. |
| 2003/0037041 | A1 | 2/2003 | Hertz |
| 2003/0037050 | A1 | 2/2003 | Monteverde |
| 2003/0050863 | A1 | 3/2003 | Radwin |
| 2003/0051240 | A1 | 3/2003 | Schaffer et al. |
| 2003/0055831 | A1 | 3/2003 | Ryan et al. |
| 2003/0061122 | A1 | 3/2003 | Berkowitz et al. |
| 2003/0069740 | A1 | 4/2003 | Zeidman |
| 2003/0084450 | A1 | 5/2003 | Thurston et al. |
| 2003/0093331 | A1 | 5/2003 | Childs et al. |
| 2003/0093793 | A1 | 5/2003 | Gutta |
| 2003/0105682 | A1 | 6/2003 | Dicker et al. |
| 2003/0110056 | A1 | 6/2003 | Berghofer et al. |
| 2003/0131070 | A1 | 7/2003 | Stroebel et al. |
| 2003/0145326 | A1 | 7/2003 | Gutta et al. |
| 2003/0182196 | A1 | 9/2003 | Huang |
| 2003/0182249 | A1 | 9/2003 | Buczak |
| 2003/0208399 | A1 | 11/2003 | Basak et al. |
| 2003/0217332 | A1 | 11/2003 | Smith et al. |
| 2003/0233655 | A1 | 12/2003 | Gutta et al. |
| 2004/0039657 | A1 | 2/2004 | Behrens et al. |
| 2004/0078214 | A1 | 4/2004 | Speiser et al. |
| 2004/0143450 | A1 | 7/2004 | Vidali |
| 2004/0143584 | A1 | 7/2004 | Chun et al. |
| 2004/0230499 | A1 | 11/2004 | Stack |
| 2004/0260621 | A1 | 12/2004 | Foster et al. |
| 2004/0267613 | A1 | 12/2004 | Chan et al. |
| 2005/0028207 | A1 | 2/2005 | Finseth et al. |
| 2005/0038717 | A1 | 2/2005 | McQueen et al. |
| 2005/0055713 | A1 | 3/2005 | Lee et al. |
| 2005/0125240 | A9 | 6/2005 | Speiser et al. |
| 2005/0144086 | A1 | 6/2005 | Speiser et al. |
| 2010/0325011 | A1 | 12/2010 | Foster et al. |
| 2011/0055040 | A1 | 3/2011 | Foster et al. |

FOREIGN PATENT DOCUMENTS

| | | |
|---|---|---|
| WO | WO-0017792 | 3/2000 |
| WO | WO-0017793 | 3/2000 |
| WO | WO-0045319 | 8/2000 |
| WO | WO-0116848 | 3/2001 |
| WO | WO-0129726 | 4/2001 |
| WO | WO-0131537 | 5/2001 |
| WO | WO-0133401 | 5/2001 |
| WO | WO-0219203 | 3/2002 |
| WO | WO-0229695 | 4/2002 |
| WO | WO-0237926 | 5/2002 |

OTHER PUBLICATIONS

Flynn, Brian; "Next hot Web play? Precision targeting," Brandweek, Feb. 19, 2001, v42i8pg21, Proquest #68864267, 3pgs.*

Andale Gallery, "Andale Gallery & Store-", Promiently Featured on Your Listings, 1 page, http://www.andale.com/corp/tour/gal_tour4.html.

Andale Gallery, "Andale Gallery-Cross-sell", Multiple Items. 2 pages, http://www.andale.com/corp/products/gallery.jsp.

Ardissono, L , et al., "Tailoring the Interaction With Users in Electronic Shops" *The 7th International Conference on User Modeling*, 1999, 10 pages, (1999).

Balabanovic, M , "An Adaptive Web Page Recommendation Service", *Stanford University Digital Libraries Project Working Paper*, 1996, 9 pages, (1996).

Breese, J. , et al., "Empirical Analysis of Predictive Algorithms for Collaborative Filtering", *Technical Report—Microsoft Research*, May 1998 revised Oct. 1998, 20 pages, (Oct. 1998).

Burke, R , "The Wasbi Personal Shopper", *a case-based recommender system, Proceedings Sixteenth National Conference on Artificial Intelligence (AAI-99)*, Jul. 18-22, 1999. pp. 844-849, (Jul. 1999).

Changchien, S W., et al., "Mining association rules procedure to support online recommendation by customers and products fragmentation", *Wxpert Syst. Appl.* (UK), vol. 20 No. 4, May 2001, pp. 325-335, (May 2001).

Cheung, N. , "Buy this!", *Ye-commerce recommendation software, information Age*, Feb. 2001, pp. 33-34.

Cheung, W. K., et al., "Mining customer preference ratings for product recommendation using the support vector machine and the latent class model", *Data Mining II*, Jul. 2000, pp. 601-610.

Claypool, M. , et al., "Inferring User Interest", *Computer Science Technical Report Series*, May 2001, 23 pages.

Cotlier, Moira , "Upselling online can raise top line", *Catalog Age*, v18n7, Jun. 1, 2001 pp. 93.

Demiriz, A. , "Enhancing Product Recommender System on Sparse Binary Data", *E-Business Department*, Verizon, Inc., 20 pages.

Ebizautos, "eBay Motors Auction Management System for Auto & Motorcycle Dealers", 1 page, http://www.ebizautos.com/.

Grama, A.Y., et al., "Privacy risks in recommerder systems", *IEEE Internet Comput* vol. 5 No. 6, Nov./Dec. 2001, PP. p. 54-62, (Nov. 2001).

Greco, C. A., "What you should know before joining an Internet mall", *Direct Marketing*, vol. 61 No. 10, Feb. 1999, pp. 42-43.

Harvey, L, "On birthdays", *mortgages, ice cream sundaes, and term life. How personalization and cross-selling tools provide cross-selling in the enterprise*, E-Business Strategies & Solutions, Jul. 1999, pp. 31-35.

Hirooka, Y, et al., "Extending content-based recommendation by order-matching and cross-matching methods", *Wlectronic Commerce and Web Technologies*, Sep. 4-6, 2000, pp. 177-190.

Hirooka, Y, et al., "Recommendation books of revealed and latent interests in e-commerce", *2000 26the Annual Conference of the IEEE Industrial Electronics Society* Part Number—vol. 3 Oct. 22-28, 2000, pp. 1632-1637.

Iacobucci, et al., "Recommendation agents on the Internet", *Journal of Interactive Marketing*, v14n3, Jan. 7, 2000, pp. 2-11.

In-Gook, Chun, et al., "The implementation of knowledge-based recommender system for electronic commerce using Java expert system library", *ISIE 2001*, pp. 1766-1770.

Kanemoto, H, "Web customer action analysis system", *Matsushita Technical Journal*, vol. 49 No. 1, Feb. 2002, pp. 26-29.

Karypis, G., "Evaluation of Item-Based Top-N Recommendation Algorithms", *University of Minnesota, Department of Computer Science/Army HPC Research Center Technical Report*, 13 pages.

Kitts, B, et al., "Cross-sell", *A Fast Promotion-Tunble Customer-item Recommendation Method based on Conditionally Independent Probabilities*, 10 pages.

Kohrs, A., et al., "Using Category-based Collaborative Filtering in the ActiveWebmuseum", *Institute EURECOM—Department of Multimedia Communications*, 4 pages.

Kumar, P., et al., "Recommendation Systems", *A probabilistic analysis, J. Computer Systems Science*, vol. 63, No. 1, Aug. 2001. pp. 42-61.

Kwak, Mira, et al., "Collaborative filtering with automatic rating for recommendation", *ISIE 2001*, vol. 1, 2001, pp. 625-628.

Kwak, M, "Web sites learn to make smarter suggestions", *MIT Sloan Management Review*, vol. 43 No. 4, Summer 2001, pp. 17.

Kyeonah, Yu, et al., "Improving the performance of collaborative recommendation by using multi-level similarity computation", *Artificial Intelligence and Soft Computing*, Jul. 24-26, 2000, pp. 241-245,.

Lee, W, "Collaborative Learning for Recommender System", 8 pages.

Loney, F. N., "Faceted preference matching in recommender systems", *Electronic Commerce and Web Technologies, Second International Conference, EC-Web 2001*, Sep. 4-6, 2001, pp. 295-304.

Maes, P., et al., "Agents that Buy and Sell", *Transforming Commerce as we Know it, 1998 MIT Media Laboratory, Submitted to the Communications of the ACM, Mar. 1999 Issue*.

McAllister, N, "Getting personal", "Web Businesses," *WEB Techniques*, Vol. 6 No. 11, Nov. 2001. pp. 35-37.

McDonald, D., et al., "Expertise Recommender", *A Flexible Recommendation System and Architecture, Department of Information and Computer Science*, 10 pages.

Nextag, "Computer Letter, Private Profiles", *NexTag—Of all the auction sites on the Web, here's one an economist might like*, Aug. 23, 1999, 3 pages, http://www.nextag.com/serv/main/about/computer/letter.html.

Pedersen, P., "Behavioral effects of using software agents for product and merchant brokering", *An experimental study of consumer decision making*, 36 pages.

Pennock, D, et al., "Social Choice Theory and recommender Systems", *Analysis of the Axiomatic Foundations of Collaborative Filtering, Proceedings of the Sevententh national Conference on Artificial Intelligence*, 2000, 6 pages.

Roe, Andy, "Amazon Adds Seller Services", Aug. 18, 1999, 1 page, http://www.auctionwatch.com/awdaily/dailynews/august99/3-081899.html.

Sawar, B., et al., "Analysis of Recommendation Algorithms for E-Commerce", *GroupLens Research Group/Army HPC Research Center*, Oct. 17-20, 2000, 10 pages.

Sawar, B., et al., "Item-Based Collaborative Filtering recommendation Algorithms", *Department of Computer Science/Army HPC Research Center*, pp. 285-295.

Schafer, J B., et al., "E-Commerce Recommendation Applications", *GroupLens Research Project Dept. of Computer Science & Engineering*, University of Minnesota, Minneapolis, MN 55455., 1-24.

Schafer, J. B., et al., "E-commerce recommendation applications", *Data Mining and Knowledge Discovery*, vol. No. 1-2, 2001, pp. 115-153.

Schafer, B., "Recommender System in E-Commerce", *Department of Science and Engineering University of Michigan*, 9 pages, (Aug. 2001).

Schien, A., et al., "Methods and Metrics for Cold-Start Recommendations", *University of Pennsylvania Dept. of Computer Science*, Aug. 11-15, 2002, 6 pages.

Schubert, P, "Virtual communities of transaction", *the role of personalization in electronic commerce, Electronics Markets*, vol. 10 No. 1, pp. 45-55.

Se June Hong, et al., "A new approach for item choice recommendations", *Data Warehousing and Knowledge Discovery*, Sep. 5-7, 2001, pp. 131-140.

Seitz, J., et al., "Impacts of software agents in e-commerce systems on customer's loyalty and on behavior of potential customers", *Challenges of Information Technology Management in the 21st Century*, May 21-24, 2000, pp. 410-414.

Towle, B, et al., "Knowledge based recommender system using explicit user models", *Knowledge-Based Electronic Markets*, 2000, pp. 74-77.

Tran, T., et al., "Hybrid recommender systems for electronic commerce", *Knowledge-Based Electronic Markets*, 2000, pp. 78-84.

WebSphere, "WebSphere Commerce Professional Edition", *More Features*, 1 page, http://www-3.ibm.com/software/webservers/commerce/wc_pe/morefeatures.html.

Weiyang, Lin, "Efficient adaptive-support association rule mining for recommender systems, Data Mining and Knowledge Discovery", vol. 6 No. 1, 2002, pp. 83-105.

Wilder, C., "E-commerce megers", *InformationWEEK*, No. 584, Jun. 17, 1996, pp. 14-15.

Yi-Ying, Chien, et al., "A personalized Internet, shopping agent", *Proceedings of the International Conference on Parallel and Distributed Processing Techniques and Applications*, Part Number—vol. 4, 2000, pp. 1849-1855.

Andale Gallery, "Andale", www.andale.com/corp/products/gallery.jsp,(Printed May 21, 2002).

Chien, Yi-Ying, et al., "A Personalized Internet Shopping Agent", *Proceedings of the International Conference on Parallel and Distributed Processing Techniques and Applications, PDPTA 2000*, 1849-1855.

Chun, In-Gook, et al., "The implementation of knowledge-based recommender system for electronic commerce using Java expert system library", *IEEE International Symposium on Industrial Electronics, 2001. Proceedings, ISIE 2001*, vol. 3, (Jun. 12-16, 2001),1766-1770.

Ebizautos, "Better Presentations. Better Results on eBay Motors.", *eBizAutos—eBay Motors Aution Management System for Auto & Moorcysle Dealers*, www.ebizautos.com,(Printed May 21, 2002),1 page.

Hong, Se J., et al., "A New Approach for Item Choice Recommendations", *Proceedings of the Third International Conference on Data Warehousing and Knowledge Discovery*, (2001),131-140.

IBM, "WebSphere Commerce Professional Edition", *Features at Glance*, www-3.ibm.com/software/webservers/commerce/wc_pe/morefeatures.html,(Printed May 21, 2002),1 page.

Lin, Weiyang, et al., "Efficient Adaptive-Support Association Rule Mining for Recommender Systems", *Data Mining and Knowledge Discovery*, 6(1), (2002),83-105.

Maes, Pattie, et al., "Agents that Buy and Sell:", *Transforming Commerence as we Know it*, 1998 MIT Media Laboratory. Submitted to the Communications of the ACM, Mar. 1999 Issue,(1998),12 pgs.

Pennock, David M., "Social Choice Theory and Recommender Ststems:", *Analysis of the Axiomatic Foundations of Collaborative Filtering*, In the preceedings of the Seventeenth National Conference on Artifical Intelligence (AAA1-2000),6 pgs.

Ramakrishnan, N., et al., "Privacy risks in recommender systems", *IEEE Internet Computing*, 5(6), (Nov.-Dec. 2001),54-62.

Wilder, C , et al., "E-Commerce Emerges", *Information Week*, No. 584, (Jun. 17, 1996),14-15.

"U.S. Appl. No. 09/769,546, Advisory Action mailed Mar. 15, 2007", 3 pgs.

"U.S. Appl. No. 09/769,546, Final Office Action mailed Jan. 9, 2009", 6 pgs.

"U.S. Appl. No. 09/769,546, Final Office Action mailed Dec. 1, 2006", 5 pgs.

"U.S. Appl. No. 09/769,546, Non Final Office Action mailed Apr. 6, 2005", 8 pgs.

"U.S. Appl. No. 09/769,546, Non Finai Office Action mailed May 16, 2007", 8 pgs.

"U.S. Appl. No. 09/769,546, Non-Final Office Action mailed Jun. 27, 2008", 5 pgs.

"U.S. Appl. No. 09/769,546, Reply Brief Filed Sep. 10, 2009 to Examiner's Answer mailed Jul. 10, 2009", 6 pgs.

"U.S. Appl. No. 09/769,546, Response filed Feb. 7, 2008 to Final Office Action mailed Nov. 16, 2007", 10 pgs.

"U.S. App. No. 09/769,546, Response filed Feb. 24, 2009 to Final Office Action mailed Jan. 9, 2009", 10 pgs.

"U.S. Appl. No. 09/769,546, Response filed Mar. 1, 2007 to Final Office Action mailed Dec. 1, 2006", 9 pgs.

"U.S. Appl. No. 09/769,546, Response filed Apr. 9, 2009 to Advisory Action mailed Mar. 19, 2009", 21 pgs.

"U.S. Appl. No. 09/769,546, Response filed Jun. 9, 2005 to Non Final Office Action mailed Apr. 6, 2005", 11 pgs.

"U.S. Appl. No. 09/769,546, Response filed Aug. 15, 2007 to Non Final Office Action mailed May 16, 2007", 9 pgs.

"U.S. Appl. No. 09/769,546, Response filed Sep. 29, 2008 to Non-Final Office Action mailed Jun. 27, 2008", 14 pgs.

"U.S. Appl. No. 10/200,908, Advisory Action mailed Aug. 27, 2004", 6 pgs.

"U.S. Appl. No. 10/200,908, Final Office Action mailed Feb. 26, 2004", 13 pgs.

"U.S. Appl. No. 10/200,908, Non Final Office Action mailed Oct. 8, 2003", 13 pgs.

"U.S. Appl. No. 10/200,908, Response filed Jan. 8, 2004 to Non Final Office Action mailed Oct. 8, 2003", 20 pgs.

"U.S. Appl. No. 10/200,908, Response filed Jun. 24, 2004 to Final Office Action mailed Feb. 26, 2004", 21 pgs.

"U.S. Appl. No. 10/666,681, Advisory Action mailed Jul. 3, 2006", 2 pgs.

"U.S. Appl. No. 10/666,681, Advisory Action mailed Oct. 7, 2009", 3 pgs.

"U.S. Appl. No. 10/666,681, Appeal Brief filed Jan. 22, 2010", 18 pgs.

"U.S. Appl. No. 10/666,681, Appeal Brief filed Jun. 25, 2007", 15 pgs.

"U.S. Appl. No. 10/666,681, Appeal Brief filed Dec. 4, 2009", 18 pgs.

"U.S. Appl. No. 10/666,681, Appeal Brief mailed Oct. 18, 2006", 11 pgs.

"U.S. Appl. No. 10/666,681, Decision on Appeal Brief mailed Sep. 3, 2010", 7 pgs.

"U.S. Appl. No. 10/666,681, Final Office Action mailed Apr. 18, 2006", 9 pgs.

"U.S. Appl. No. 10/666,681, Final Office Action mailed Jul. 15, 2009", 8 pgs.

"U.S. Appl. No. 10/666,681, Non Final Office Action mailed Nov. 16, 2005", 17 pgs.

"U.S. Appl. No. 10/666,681, Pre-Appeal Brief Request filed Jul. 18, 2006", 3 pgs.

"U.S. Appl. No. 10/666,681, Pre-Appeal Brief Request mailed Oct. 14, 2009", 5 pgs.

"U.S. Appl. No. 10/666,681, Response filed Jan. 30, 2006 to Non Final Office Action mailed Nov. 16, 2005", 7 pgs.

"U.S. Appl. No. 10/666,681, Response filed Jun. 19, 2006 to Final Office Action mailed Apr. 18, 2006", 8 pgs.

"U.S. Appl. No. 10/666,681, Response filed Jul. 21, 2005 to Restriction Requirement mailed Jun. 21, 2005", 9 pgs.

"U.S. Appl. No. 10/666,681, Response filed Sep. 15, 2009 to Final Office Action mailed Jul. 15, 2009", 8 pgs.

"U.S. Appl. No. 10/666,681, Restriction Requirement mailed Jun. 21, 2005", 6 pgs.

"U.S. Appl. No. 10/689,970, Supplemental Notice of Allowability mailed Jul. 26, 2010", 6 pgs.

"U.S. Appl. No. 10,689,970, Appeal Brief filed Jun. 28, 2007", 26 pgs.

"U.S. Appl. No. 10/689,970, Final Office Action mailed Jan. 25, 2007", 18 pgs.

"U.S. Appl. No. 10/689,970, Non Final Office Action mailed Jun. 13, 2006", 14 pgs.

"U.S. Appl. No. 10/689,970, Notice of Allowance mailed Jan. 20, 2010", 9 pgs.

"U.S. Appl. No. 10/689,970, Notice of Allowance mailed Jun. 29, 2010", 6 pgs.

"U.S. Appl. No. 10/689,970, Reply Brief filed Dec. 3, 2007", 10 pgs.

"U.S. Appl. No. 10/689,970, Response filed Oct. 13, 2006 to Non Final Office Action mailed Jun. 13, 2006", 11 pgs.

"U.S. Appl. No. 10/877,806 Final Office Action mailed Jul. 8, 2010", 9 pgs.

"U.S. Appl. No. 10/877,806, Advisory Action mailed Mar. 11, 2009", 3 pgs.

"U.S. Appl. No. 10/877,806, Advisory Action mailed Sep. 28, 2010", Advisory Action, 3 pgs.

"U.S. Appl. No. 10/877,806, Appeal Brief filed Jan. 13, 2011", 25 pgs.

"U.S. Appl. No. 10/877,806, Examiner's Answer mailed Apr. 4, 2011", 10 pgs.

"U.S. Appl. No. 10/877,806, Final Office Action mailed Dec. 18, 2008", 8 pgs.

"U.S. Appl. No. 10/877,806, Non-Final Office Action mailed Jan. 8, 2010", 9 pgs.

"U.S. Appl. No. 10/877,806, Non-Final Office Action mailed Jun. 11, 2009", 8 pgs.

"U.S. Appl. No. 10/877,806, Non-Final Office Action mailed Jun. 12, 2008", 14 pgs.

"U.S. Appl. No. 10/877,806, Preliminary Amendment filed May 4, 2005", 9 pgs.

"U.S. Appl. No. 10/877,806, Response filed Feb. 17, 2009 to Dec. 18, 2008", 9 pgs.

"U.S. Appl. No. 10/877,806, Response filed Mar. 19, 2008 to Restriction Requirement mailed Feb. 19, 2008", 7 pgs.

"U.S. Appl. No. 10/877,806, Response filed Apr. 8, 2010 to Non Final Office Action mailed Jan. 8, 2010", 11 pgs.

"U.S. Appl. No. 10/877,806, Response filed Sep. 7, 2010 to Final Office Action mailed Jul. 8, 2010", 12 pgs.

"U.S. Appl. No. 10/877,806, Response filed Sep. 11, 2009 to Non Final Office Action mailed Jun. 11, 2009", 9 pgs.

"U.S. Appl. No. 10/877,806, Response filed Sep. 12, 2008 to Non-Final Office Action mailed Jun. 12, 2008", 10 pgs.

"U.S. Appl. No. 10/877,806, Restriction Requirement mailed Feb. 19, 2008", 7 pgs.

"U.S. Appl. No. 12/870,022 , Response filed Sep. 13, 2011 to Final Office Action mailed Jul. 28, 2011", 13 pgs.

"U.S. Appl. No. 12/870,022, Advisory Action mailed Sep. 26, 2011", 3 pgs.

"U.S. Appl. No. 12/870,022, Final Office Action mailed Jul. 28, 2011", 15 pgs.

"U.S. Appl. No. 12/870,022, Non Final Office Action mailed Mar. 17, 2011", 13 pgs.

"U.S. Appl. No. 12/870,022, Pre-Appeal Brief Request filed Oct. 4, 2011", 5 pgs.

"U.S. Appl. No. 12/870,022, Response filed Jun. 3, 2011 to Non Final Office Action mailed Mar. 17, 2011", 16 pgs.

"International Application Serial No. PCT/US03/33294, International Preliminary Report on Patentability mailed Jan. 30, 2006", 4 pgs.

"International Application Serial No. PCT/US03/33294, International Search Report mailed Jun. 14, 2005", 8 pgs.

"International Application Serial No. PCT/US03/33294, Written Opinion mailed Sep. 28, 2005", 4 pgs.

"Query—Definition by Dictionary.com", [Online]. Retrieved from the Internet: <http://dictionary.reference.com/browse/query>, (Accessed 2011), 1 pg.

"U.S. Appl. No. 12/870,022, Advisory Action mailed Nov. 9, 2011", 4 pgs.

"U.S. Appl. No. 12/870,022, Decision on Pre-Appeal Brief mailed Nov. 14, 2011", 2 pgs.

"U.S. Appl. No. 09/769,546, Decision on Appeals mailed Feb. 21, 2012", 11 pgs.

"U.S. Appl. No. 09/769,546, Response filed Apr. 20, 2012 to Decision on Appeal mailed Feb. 21, 2012 and Final Office Action mailed Jan. 9, 2009", 10 pgs.

"U.S. Appl. No. 10/666,681, Decision on Pre-Appeal Brief Request Aug. 16, 2006", 2 pgs.

"U.S. Appl. No. 10/666,681, Examiner's Answer to Appeal Brief mailed Apr. 15, 2010", 9 pgs.

"U.S. Appl. No. 10/666,681, Non Final Office Action mailed Apr. 17, 2012", 10 pgs.

"U.S. Appl. No. 10/877,806, Appeal Brief filed Dec. 7, 2010", 32 pgs.

"U.S. Appl. No. 10/877,806, Preliminary Amendment filed May 6, 2005", 9 pgs.

"U.S. Appl. No. 10/877,806, Reply Brief filed Jun. 3, 2011", 6 pgs.

"U.S. Appl. No. 12/870,022, Advisory Action mailed Jan. 19, 2012", 3 pgs.

"U.S. Appl. No. 12/870,022, Appeal Brief Based on Pre-Appeal Brief Review Filed Jan. 10, 2012", 23 pgs.

* cited by examiner

900

910

| Item # | End Date | Price | Item Title |
|---|---|---|---|
| 1600041041 | 2001-06-16 09:38:41 | DM 31.00 | Football |
| 1600041027 | 2001-06-16 09:38:35 | DM 501.00 | Baseball |
| 1200244601 | 2001-06-16 09:38:34 | DM101.00 | Tennis ball |
| 1600041026 | 2001-06-16 09:38:34 | DM 1,050.00 | Signed baseball |
| 1200244660 | 2001-06-16 09:38:33 | DM 30.00 | Soccer ball |

911 912 913 914

930

| Item # | Item Title | Price | Bids | End Date |
|---|---|---|---|---|
| 1100108432 | Signed baseball | | | |
| 1100108435 | Signed baseball | $120.00 | 1 | Jun-13 17:13 |
| 1100108436 | Signed soccer ball | $510.00 | 1 | Jun-10 17:13 |
| 1400386061 | Signed football | $510.00 | 1 | Jun-10 17:13 |

931 932 933 934 935

950

| Item Title | Price | In Stock |
|---|---|---|
| Tennis ball | $3.37 | 14 available now |

End of Item Notices for Unsuccessful Bidders

● Yes (Include my items) — 1010
○ No (do not include my items) — 1015

Yes Means
- Your unsuccesssssful bidders will be told they lost.
- These bidders will be pointed to your other auctions.
- These bidders will see similarly titled items from others
- Your items will be showcased in emails to other unsuccessful bidders.

No Means
- Your unsuccessful bidders will not be shown links to your other auctions.
- Your items will not appear in the similar items list sent to other unsuccessful bidders.

FIG. 10

End of Item Notice

Notify me when an item ends if I did not win the item.

Note: An email will always be sent to the winning bidder and seller.

○ Yes ← 1110
○ No ← 1115

METHOD AND SYSTEM TO RECOMMEND FURTHER ITEMS TO A USER OF A NETWORK-BASED TRANSACTION FACILITY UPON UNSUCCESSFUL TRANSACTING WITH RESPECT TO AN ITEM

RELATED APPLICATIONS

This application claims the benefit of U.S. Provisional Application No. 60/373,525, filed Apr. 17, 2002.

FIELD OF THE INVENTION

The present invention relates generally to the field of Internet-based commerce and, more specifically, to a method of recommending similar commerce goods.

BACKGROUND OF THE INVENTION

Electronic commerce (a.k.a., e-commerce) technology holds the promise of introducing efficiencies into marketplace and trading activities by automating many trading activities, providing near real-time information to both buyers and sellers and providing convenient channels between buyers and sellers.

One example of the e-commerce technology is network-based auction facilities allowing buyers to bid on products and services offered by sellers. In an auction environment only a person who places the highest bid on a particular product or service will be able to purchase that product or service. The unsuccessful bidders who are still interested in obtaining a similar product or service through the same transaction facility are required to search the remaining available items offered for sale through the facility. The transaction facility may contain a large number of items to be searched by the unsuccessful bidders. In addition, in some situations in order to obtain a list of similar items, an unsuccessful bidder has to conduct a sophisticated search requiring an accurate choice of keywords.

SUMMARY OF THE INVENTION

A method and an apparatus for communicating a recommended item to a user of a network-based transaction facility are described. The method comprises determining that the user has been unsuccessful in concluding a transaction pertaining to an item offered for sale via the network-based transaction facility, and, in response to this determination, communicating information concerning a recommended item to the user over a network. The recommended item is available for purchase via the network-based transaction facility.

BRIEF DESCRIPTION OF THE DRAWINGS

The present invention is illustrated by way of example and not limitation in the figures of the accompanying drawings, in which like references indicate similar elements and in which:

FIG. 9 illustrates a graphical interface according to one embodiment of the present invention;

FIG. 10 illustrates a graphical interface to allow a buyer to specify user preferences according to one embodiment of the present invention;

FIG. 11 illustrates a graphical interface to allow a seller to specify user preferences according to one embodiment of the present invention.

DETAILED DESCRIPTION

Figure 1:
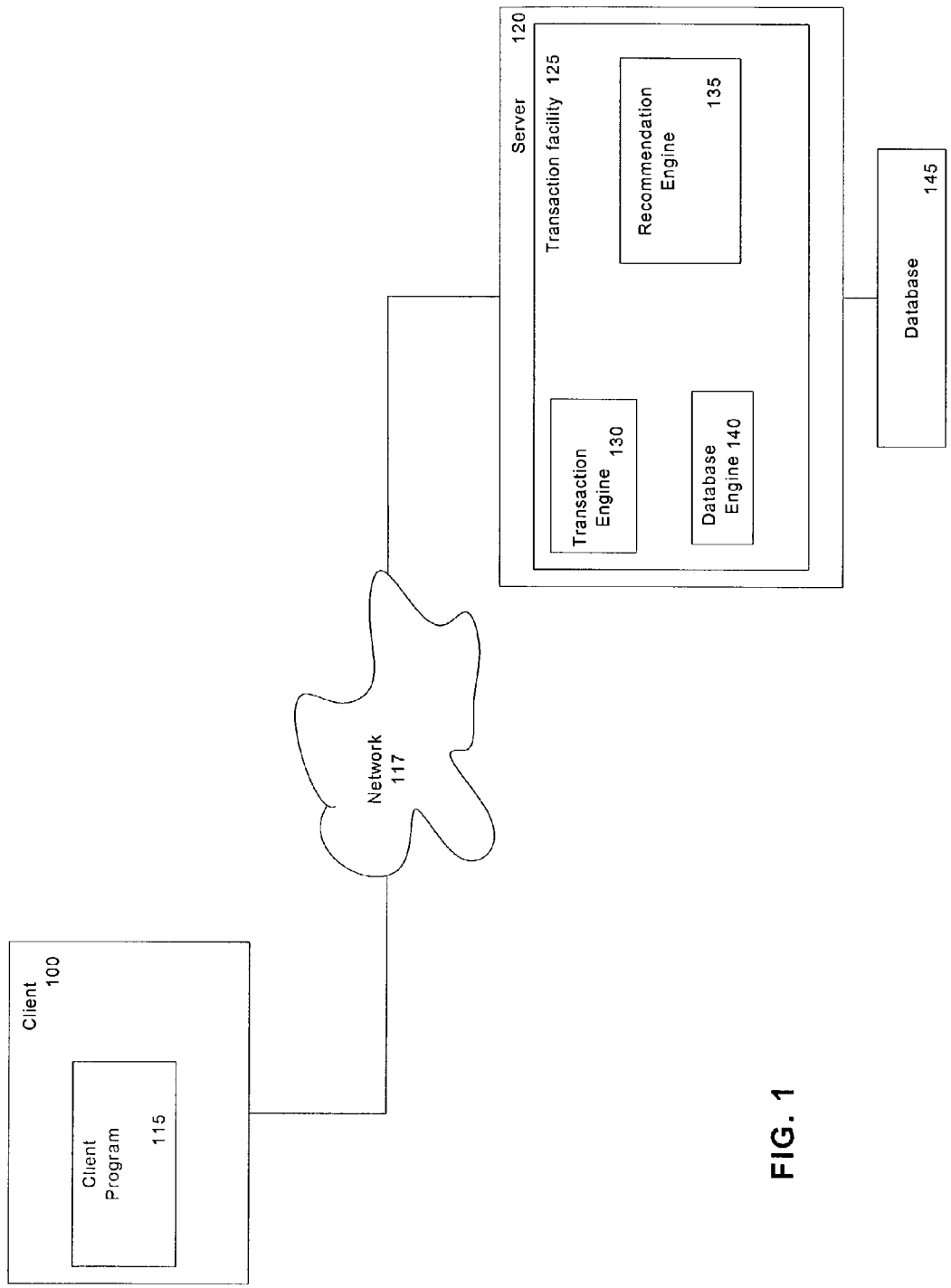
FIG. 1 illustrates an exemplary network architecture in which an embodiment of the present invention may be implemented.

In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Internet-Related Technology

As indicated above, one embodiment of the present invention provides an Internet-based implementation. Accordingly, some introduction to Internet-related technology is helpful in understanding the present invention. The Internet is a vast and expanding network of computers and other devices linked together by various telecommunications media, enabling the various components to exchange and share data. Sites (so-called Web sites), accessible through Internet, provide information about numerous corporations and products, as well as education, research, entertainment and services.

A resource that is attached to the Internet is often referred to as a "host." Examples of such resources include conventional computer systems that are made up of one or more processors, associated memory and other storage devices and peripherals, such as modems, networks interfaces and the like that allow for connection to the Internet or other networks. In most cases, the hosting resource may be embodied as hardware and/or software components of a server or other computer system that includes an interface module, which allows for some dialog with users and that may process information through the submission of Web forms completed by the user. Generally, such a server will be accessed through the Internet's graphical user interface, the World Wide Web, (e.g., via Web browsers) in the conventional fashion.

In order to facilitate communications between hosts, each host has a numerical Internet Protocol (IP) address. The IP address of a hypothetical host computer might be 112.222.64.27. Each host also has a unique "fully qualified domain name." In the case of the hypothetical host 112.222.64.27, the "fully qualified domain name" might be "computer.domain.com", the three elements of which are the hostname ("computer"), a domain name ("domain") and a top level domain ("corn"). A given host looks up the IP address of other hosts on the Internet through a system known as domain name service.

As previously indicated, in order to access the Internet most users rely on computer programs known as "Web browsers." Commercially available Web browsers include such well-known programs as Netscape's Navigator™ and Communicator™ and Microsoft's Internet Explorer™. If an Internet user desires to establish a connection with a Web page hosted at computer.domain.com, the Internet user might enter into a Web browser program the uniform resource locator (URL) "http://www.domain.com". The first element of the URL is a transfer protocol, most commonly "http" standing for hypertext transfer protocol, but others include "mailto" for electronic mail, "ftp" for file transfer protocol, and "nntp" for network news transfer protocol. The remaining elements of this URL are an alias for the fully qualified domain name of the host.

Once a URL is entered into the browser, the corresponding IP address is looked up in a process facilitated by a server computer, called the top-level server. The top-level server matches the domain name to an IP address of a domain name server capable of directing the inquiry to the computer hosting the Web page. Thus, the domain name server ultimately matches an alphanumeric name such as www.domain.com with its numeric IP address 112.222.64.27.

When a host receives an inquiry from the Internet, it returns the data in the file pointed to by the request to the computer making the inquiry. Such data may make up a Web page, which may include a textual message, sound, picture, or a combination of such elements. A user can move between Web pages through the use of hyperlinks, which are links from one site on the Internet to another.

A component of one embodiment of the present invention is a computer server. Servers are computer programs that provide some service to other programs, called clients. A client and server communicate by means of message passing often over a network, and use some protocol, a set of formal rules describing how to transmit data, to encode the client's requests and/or responses and the server's responses and/or requests. The server may run continually waiting for client's requests and/or responses to arrive or it may be invoked by some higher level continually running server, which controls a number of specific servers. Client-server communication is analogous to a customer (client) sending an order (request) on an order form to a supplier (server) dispatching the goods and an invoice (response). The order form and invoice are part of the protocol used to communicate in this case.

Exemplary Architecture

With these concepts in mind, an exemplary embodiment of a system architecture of the present invention can be explored. FIG. 1 is a block diagram illustrating an exemplary network-based transaction facility in the form of an Internet-based transaction facility 125. While an exemplary embodiment of the present invention is described within the context of an auction facility, it will be appreciated by those skilled in the art that the invention will find application in many different types of computer-based, and network-based, transaction facilities.

The term "item" is used below to designate any offering by a seller to a buyer, and this term should be understood to include, but not be limited to, any product or service offering. The term "user" is used below to designate any user, buyer or seller, of the transaction facility. The term "original item" is designated to an item on which a buyer unsuccessfully bid.

Referring to FIG. 1, the transaction facility 125 is located on a server machine 120 and includes a number of engines, namely an auction engine 130 to allow buyers to bid on items presented by the sellers, a recommendation engine 135 to compile a list of items similar to the one on which a buyer lost his/her bid and a database engine 140 to maintain database 145.

The Internet-based transaction facility 125 may be accessed by a client program 115, such as a browser (e.g., the Internet Explorer distributed by Microsoft Corp. of Redmond, Wash.) that executes on a client machine 100 (e.g., a personal computer, PDA, cell phone or the like) and accesses the facility 125 via a network 117 such as, for example, the Internet. Other examples of networks that a client may utilize to access the transaction facility 125 include a wide area network (WAN), a local area network (LAN), a wireless network (e.g., cellular network), the Plain Old Telephone Service (POTS) network, etc.

Figure 2:
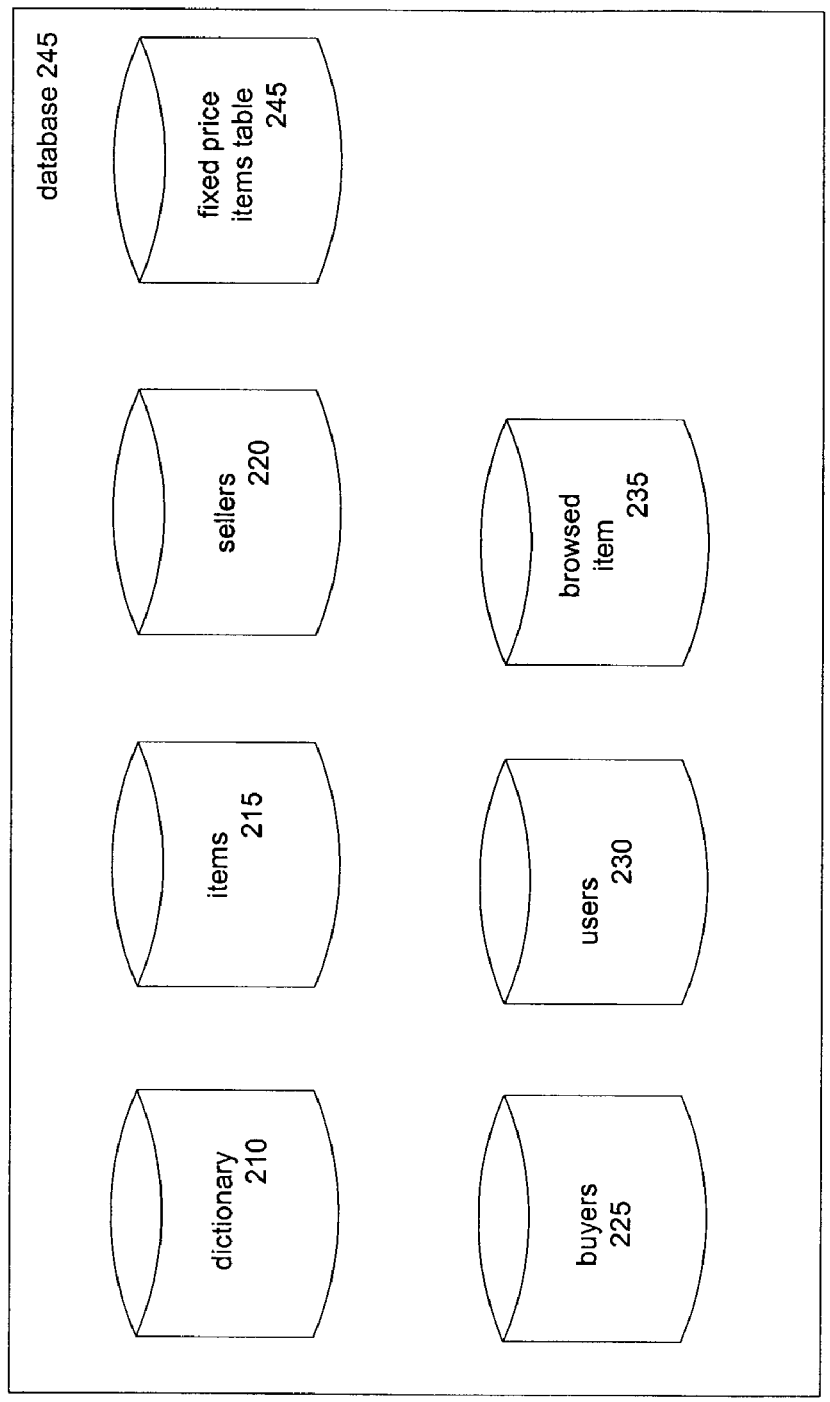
FIG. 2 illustrates database components according to one embodiment of the present invention.

FIG. 2 is a database diagram illustrating an exemplary database 145 of FIG. 1, maintained by and accessed via the database engine 140, which at least partially implements and supports the transaction facility 125. The database 145 comprises a number of tables, namely a dictionary table 210, an items table 215, a sellers table 220, a buyers table 225, a users table 230, a browsed item table 235 and a fixed price items table 250. In one embodiment, the database set 245 of FIG. 2 is implemented as a relational database, and includes a number of tables having entries, or records, that are linked by indices and keys. In an alternative embodiment, the database 245 may be implemented as collection of objects in an object-oriented database.

Central to the database 245 is the users table 230, which contains a record for each user of the transaction facility 125. A user may operate as a seller, buyer, or both, within the transaction facility 125. The database 245 also includes the items table 215 that may be linked to the users table 230. A user record in the users table 230 may be linked to multiple items that are being, or have been, auctioned via the facility 125.

The database 245 also includes the sellers table 220, which contains a record for each seller providing items via the transaction facility 125. The database also includes the buyers table 225, which contains a record for each buyer attempting to acquire items via bidding.

The database 245 is also shown to include a dictionary table 210 that stores terms and/or keywords that may be found in a description of an item offered for sale via the transaction facility 125.

In addition, the database 245 is also shown to include a browsed item table 235 that stores item viewing history for each user of the transaction facility 125. The database 245 comprises a fixed price items table 245 including items that are offered for sale at a fixed, non-negotiable, price.

It will be appreciated by one skilled in the art that the tables may have additional fields and are not limited to the above-described fields.

Figure 3A:
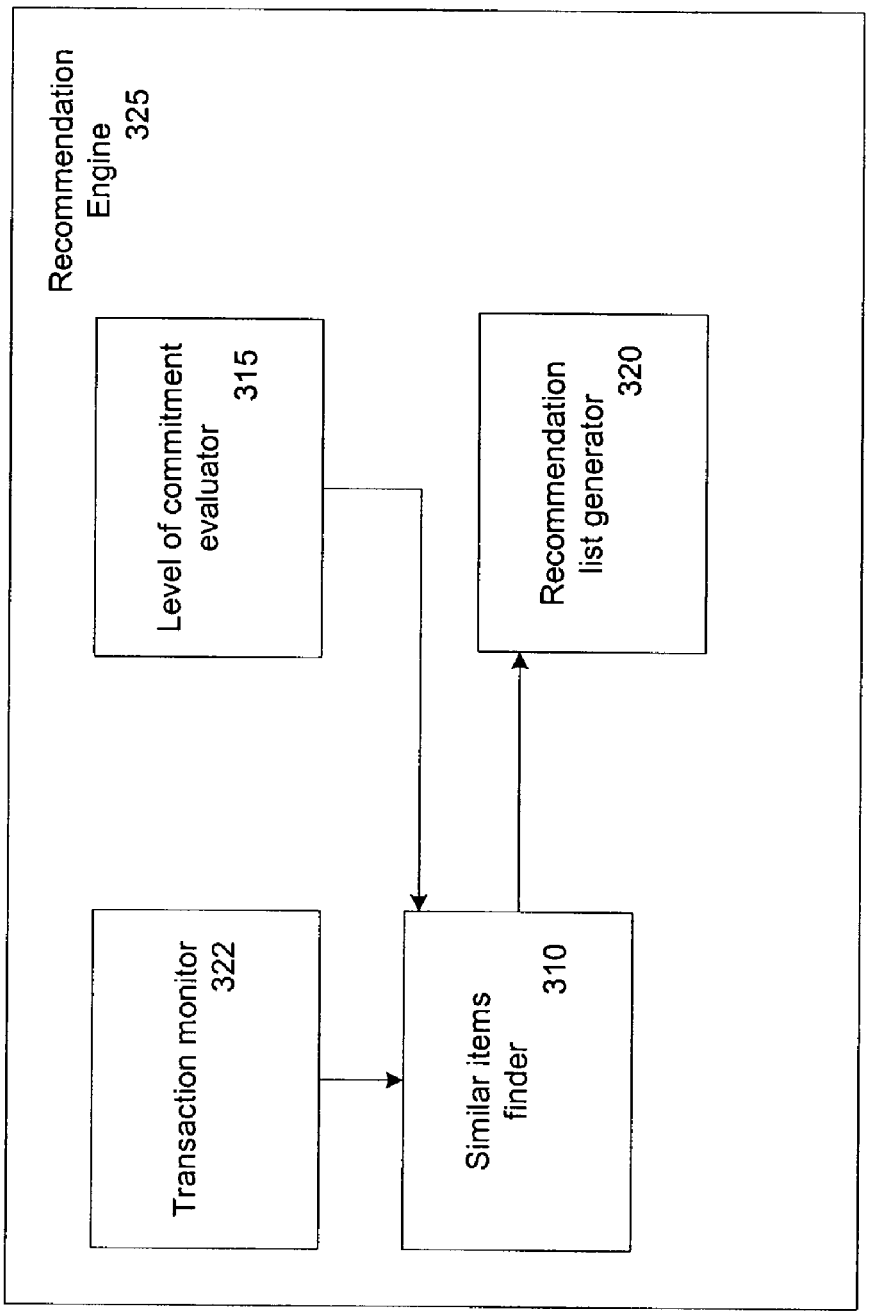
FIG. 3A illustrates components of a recommendation engine according to one embodiment of the present invention.

FIG. 3A illustrates an exemplary embodiment of the recommendation engine 325. The recommendation engine 325 includes a transaction monitor 322, a similar items finder 310, a level of commitment evaluator 315, and a recommendation list generator 320.

The transaction monitor 322 is responsible for monitoring transactions between users of the transaction facility 125 and identifying users who were unsuccessful in concluding transactions. The similar items finder 310 is responsible for locating items offered by sellers of the transaction facility 125 that are similar to an item on which a buyer was unable to conclude the transaction. The level of commitment evaluator 315 is responsible for determining a level of interest of a user in a particular item offered for sale via the transaction facility 125. In one embodiment, the level of interest of the user in the particular item is utilized to determine whether to present the user with a recommendation list containing items similar to the particular item.

The recommendation list generator 320 is responsible for generating a list of similar items located by the similar items finder 310.

While the recommendation engine 325 is described herein as utilizing certain techniques and methodologies to identify recommended items to be recommended to a user, it will be appreciated that any one of a wide variety of recommendation techniques and methodologies may be applied to identify recommended items.

Figure 3B:
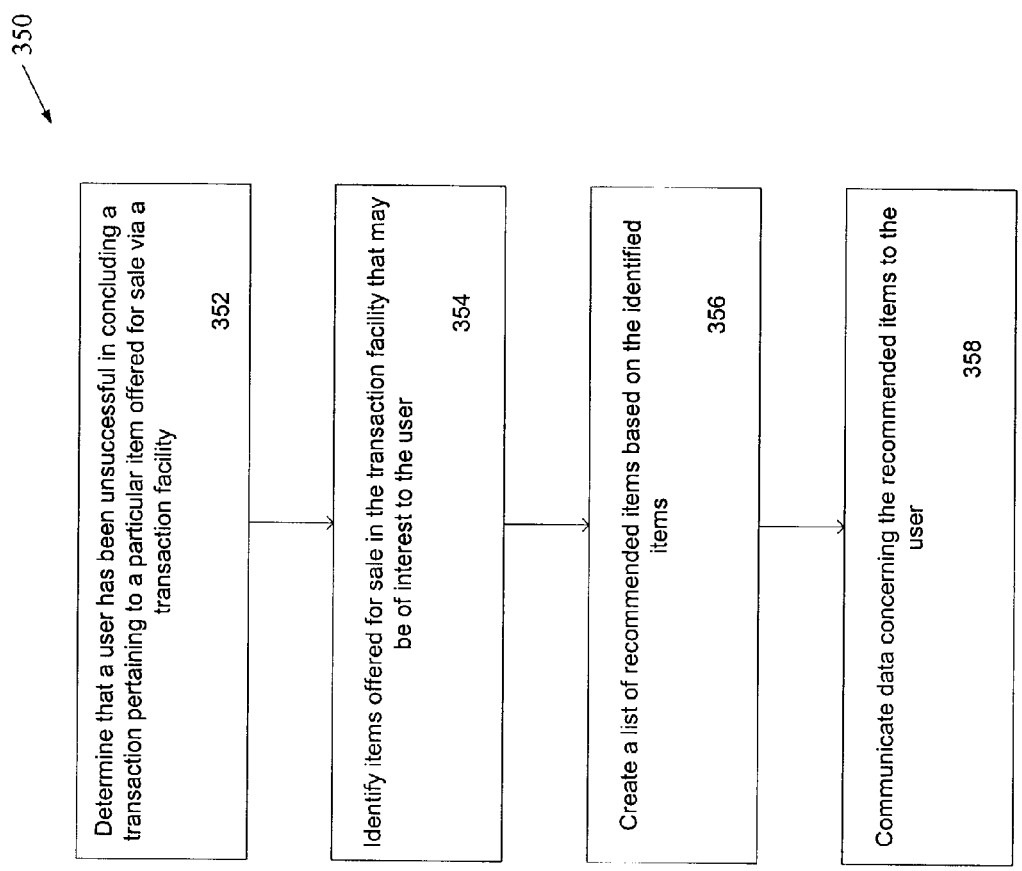
FIG. 3B is a flow diagram of a method for communicating a recommended item to a user of a network-based transaction facility according to one embodiment of the present invention.

FIG. 3B is a flow diagram of one embodiment of a method 350 for communicating recommended items to a user of a network-based transaction facility such the transaction facility 125. Initially, at processing block 352, the transaction monitor 322 determines that a user has been unsuccessful in concluding a transaction pertaining to a particular item offered for sale via the transaction facility 125. In one embodiment, this determination is made if the user was unsuccessful in biding to purchase the particular item. In another embodiment, this determination is made if the user was unable to satisfy some conditions associated with the transaction pertaining to the particular item (e.g., the user's transaction history within the transaction facility 125 may be shorter than required for purchasing the particular item).

Next, at processing block 354, the similar items finder 310 identifies other items offered for sale in the transaction facility 125 that may be of interest to the user. These other items are items that have some similarity to the particular item. In one embodiment, each of these similar items may be identified based on keywords included in its description as will be described in more detail below. In another embodiment, in which the transaction facility 125 supports a hierarchical data structure of categories, the similar items finder 310 identifies the items that may be of interest to the user based on a category to which the particular item is categorized by the transaction facility 125. This category may correspond to any category level within the hierarchical data structure of categories (e.g., the "cars" category, the "BMW cars" category, the "BMW 740 models" category, etc.).

Further, at processing block 356, the recommendation list generator 320 creates a list of recommended items based on the items identified by the similar items finder 310.

Afterwards, at processing block 358, the transaction facility 125 communicates data concerning the recommended items to the user. This data may include, for example, the list of recommended item or a link to the list of recommended item.

Methodology: Lost Bid Notification

Figure 4:
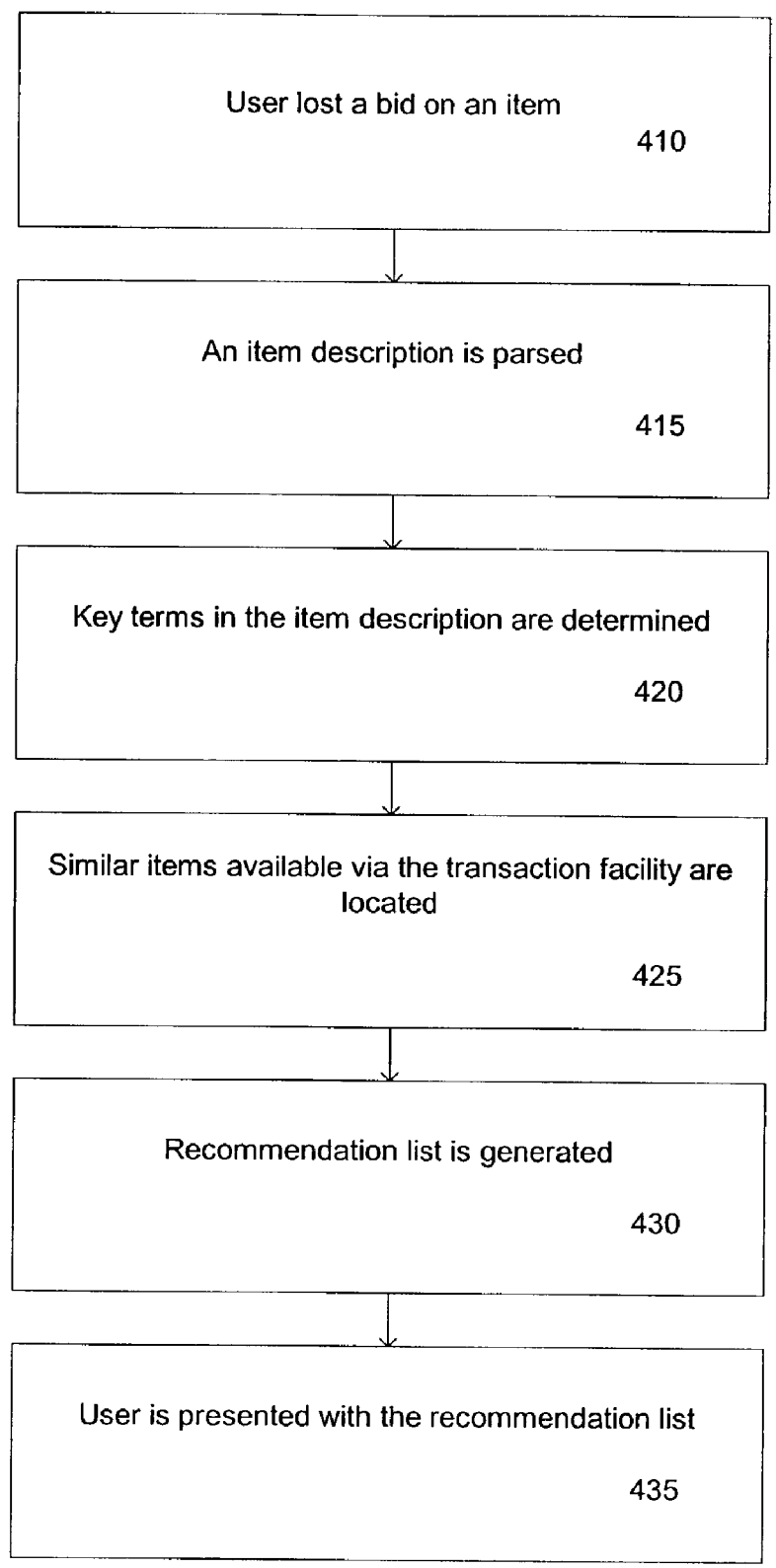
FIG. 4 is a flow diagram of a similar items list generation process according to one embodiment of the present invention.
Figure 5:
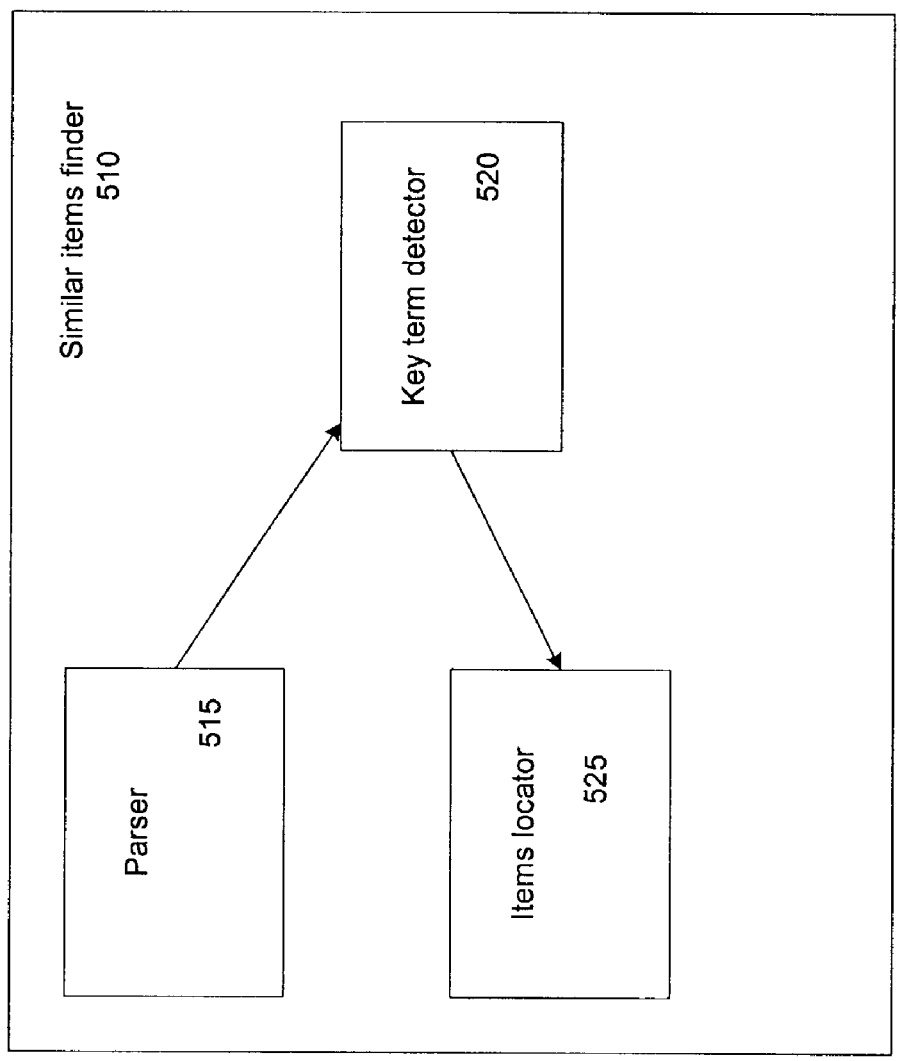
FIG. 5 illustrates components of a similar items finder according to one embodiment of the present invention.

With these concepts in mind an embodiment of the present invention can be further explored with reference to FIGS. 4 and 5. Upon one of the users placing a highest, and winning, bid on a particular item prior to the end of an auction session, the other users, i.e. unsuccessful bidders, who had bid on the same item, but whose bids were not high enough to purchase the item, are notified that their bid was not high enough. Along with the notification of a lost auction session, each unsuccessful user is provided with a list of similar items currently available via the transaction facility 125 that may be of interest to the user.

In order to generate a list of similar items, a parser 515 of similar items finder 510, illustrated in FIG. 5, retrieves a description of the item, on which the user unsuccessfully bid, from the items table 215. Upon retrieval of the item description, the parser 515 at 415 of FIG. 4 parses the description to identify keywords. In one embodiment, every word of the item description is searched in the dictionary table 210 to determine if the parsed word is a key word. For example, an item description "Barbie™ doll" is parsed by the parser 515 into two words "Barbie" and "doll". At 420, upon parsing the description, a key term detector 520 searches the dictionary table 210 for terms "Barbie" and "doll" to determine if either of the words included in the item description are keywords that may be utilized to search for similar items available via the transaction facility 125. It will be appreciated by one skilled in the art that searching the dictionary table 210 for keywords is not limited to any particular searching technique and a variety of searching techniques may be utilized.

Upon determining which keywords are present in the item description, the items locator 525 searches the items table 215 of FIG. 2 for currently offered items which description indicates that the item may be similar to the one that the user could not purchase due to a low placed bid. In one embodiment, the items locator 525 searches for items which description contains keywords retrieved from the description of the original item. For example, if the description of the item that the user could not purchase is "Barbie™ doll", and the word "Barbie" and the word "doll" were determined to be keywords by the key term detector 520, then the items locator 525 may search the items table 215 for items which description contains the word "Barbie" or word "doll", or both.

In one embodiment, the dictionary table 210 comprises words that were assigned a weight greater than a pre-determined threshold. The weight of a word depends on how frequently this word had been used in item descriptions within the transaction facility 125. Words that are infrequently included in item descriptions are assigned higher weights than the ones that are frequently can be found in an item description. For example, in an item description "Book by Asimov in good condition", the word "Asimov" will be assigned a greater weight than the word "book." It will be appreciated by one skilled in the art that the pre-determined threshold is not limited to any value and may be set based on a particular implementation of the transaction facility 125.

In another embodiment, the parser 515 parses the item description to identify the words that contain a number of letters greater than a pre-determined number of letters threshold. For example, the number of letters threshold may be set to 7 indicating that every word that contains more than 7 letters is a keyword to be utilized in the recommendation list generation. If a particular item description does not include words comprising a number of letters greater that the number of letters threshold, the parser 515 determines the longest words out of all the words contained in the item description in order for the items locator 525 to utilize these words as keywords in locating similar items in the items table 215. In one embodiment there may be a word limit threshold indicating how many words to use as keywords when none of the words are longer than the threshold. For example, the word limit threshold may be set to 1 indicating that if the item description does not include words longer than the threshold, then only the longest word from the item description may be used as a keyword by the items locator 525.

It will be appreciated that other mechanisms for finding similar items may be employed. For example, a collaborative filtering method may be utilized, wherein similar items are identified by determining other users that were interested in the item on which the user unsuccessfully bid, and identifying other items in which those users showed interest.

In one embodiment the recommendation list generator 320 of FIG. 3 at 430 generates a list of similar items that were located in the items table 215 by the items locator 525. In one embodiment the recommendation list generator 320 generates two lists, one comprising similar items being sold by the same seller, and the other list comprises similar items that may be of interest to the user that are being sold by sellers other than the seller of the original item.

At 435 the recommendation engine 325 may present the user with the generated recommendation list including items that may be of interest to the user. In one embodiment, the user may be presented with the recommendation list via an email message comprising the generated recommendation list. In another embodiment, the user may be provided with an email message comprising a link to a web page containing the recommendation list. In yet another embodiment, the recommendation list may be presented to the user next time the user utilizes the features of the transaction facility 125, for example, upon the next user's log-in into the transaction facility 125.

In one embodiment, in order to ensure that the seller of the original item has enough time to re-list items that he/she is currently attempting to sell via the transaction facility 125, the unsuccessful bidders are presented with the recommendation list by the recommendation engine 325 upon an expiration of a time interval from the termination of the auction session, for example 24 hours later. It will be appreciated that the time interval is not limited to the above example, and any time interval may be utilized to allow the sellers to re-list their items.

In one embodiment of the present invention, the generated recommendation list may comprise only items that are being sold by the seller of the original item. Alternatively, the generated recommendation list may also comprise similar items that are sold by sellers other than the seller of the original item.

Methodology: Items of Interest Notification

Figure 6:
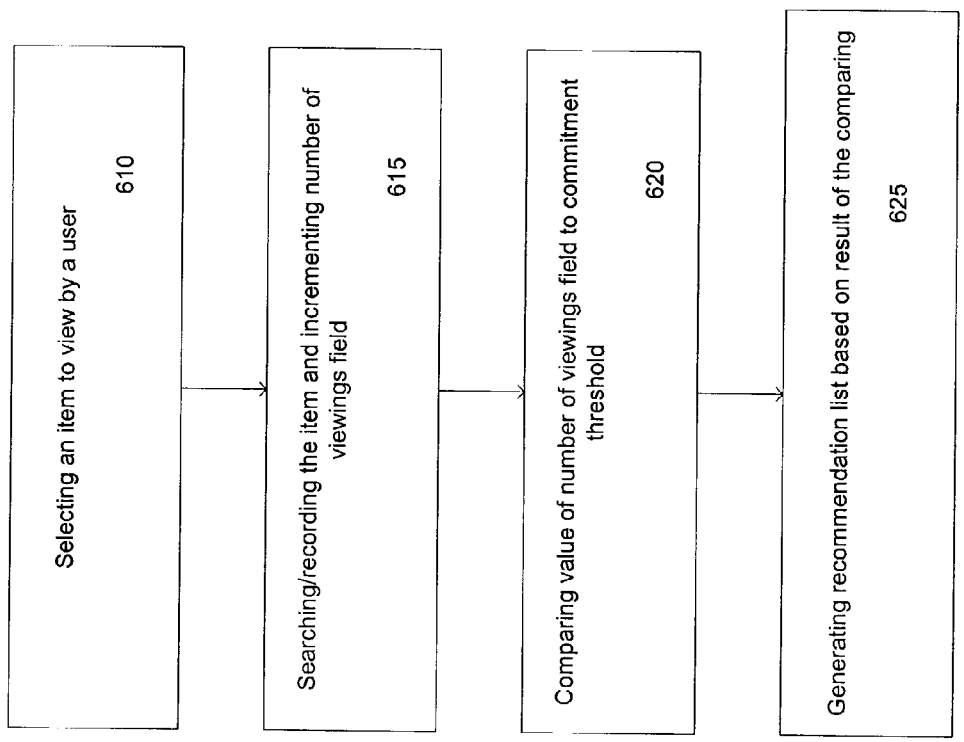
FIG. 6 is a flow diagram of a similar items list generation process for an item browsed by a user according to one embodiment of the present invention.
Figure 7:
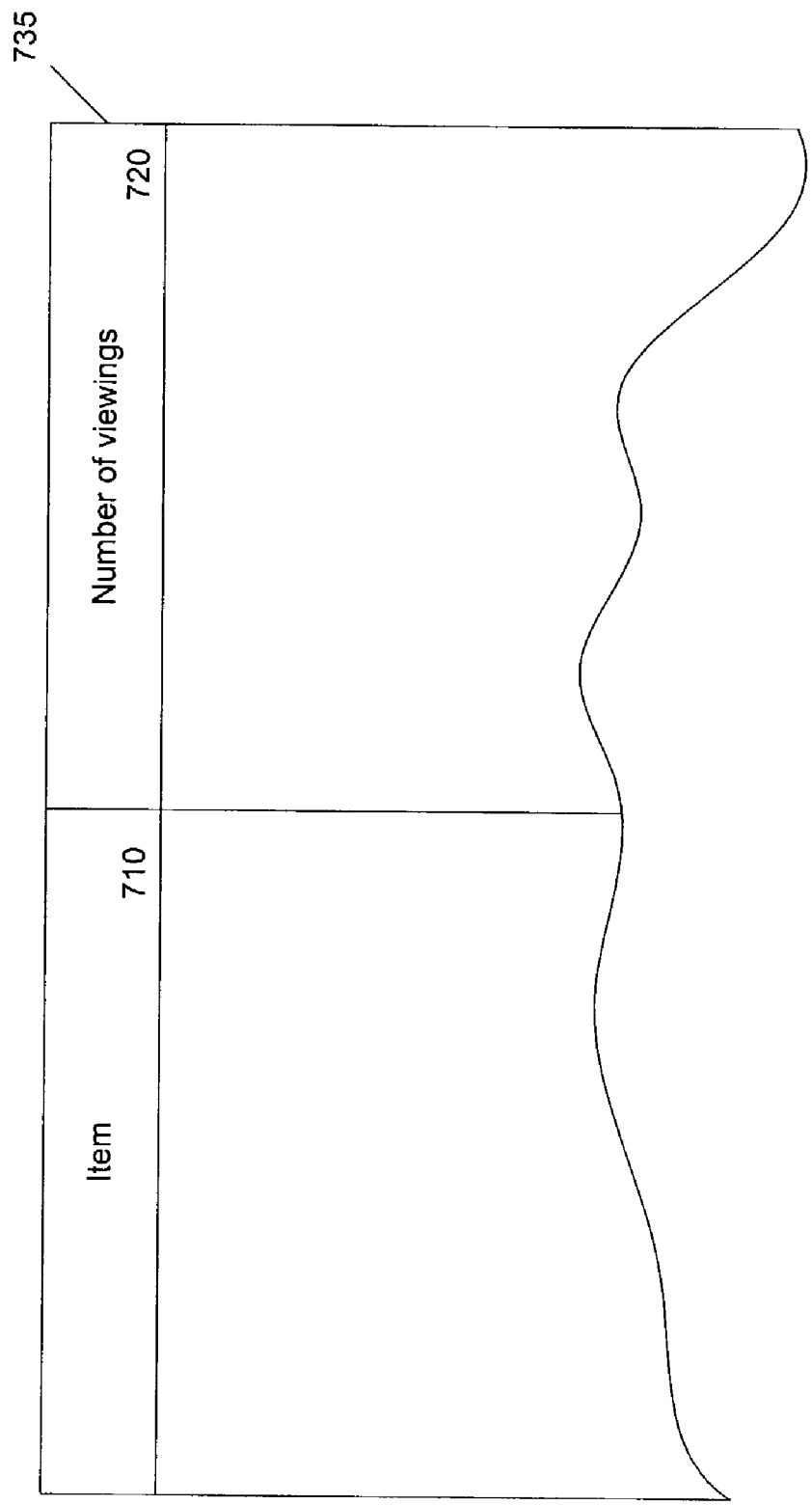
FIG. 7 illustrates a browsed item table according to one embodiment of the present invention.

In one embodiment of the present invention, the user of the transaction facility 125 does not have to bid on an item in order to receive a recommendation list of items that may be of interest to the user. The user may be presented with a recommendation list based on the user's actions, for example, a selection of a particular item within a category, a request to view a particular item without making a bid on this item, etc. This embodiment is described with reference to FIG. 6. At 610 a user selects an item for viewing presented via the client program 115 and available via the transaction facility 125 of FIG. 1. At 615, upon the user selecting the item available on the transaction facility 125, the level of commitment evaluator 315 of FIG. 3 may search an item field 710 of the browsed item table 735 illustrated in FIG. 7 for the selected item. The level of commitment evaluator 315 may also increment a value in a number of viewings field 720 of the browsed item table 735 corresponding to the user-selected item upon completion of a successful search for the user-selected item. If the selected item is not present in the browsed item table 735, the level of commitment evaluator 315 may record the name of the selected item in the item field 710 of the browsed item table 735. In one embodiment the level of commitment evaluator 315 may insert value 1 into the number of viewings field 720 upon insertion of the user-selected item into the browsed category table 735.

At 620 the level of commitment evaluator 315 compares the value of the number of viewings field 715 to a commitment threshold. In one embodiment of the present invention, the commitment threshold represents a level of user interest in a particular item. For example, if the value of the commitment threshold is 3, it indicates that if the same user selects a particular item three times, the particular item is of importance to the user, indicating that the user may be interested in the items similar to the selected item.

At 625 if the value of the number of viewings field is greater than the value of the commitment threshold, the recommendation engine 325 may generate a recommendation list comprising other items that are similar to the user selected item and may be of interest to the user. In one embodiment, the recommendation engine 325 may locate similar items by parsing the description of the item selected by the user and locating other items which descriptions contain identical keywords as the description of the selected item. This technique is described in more detail above with reference to FIG. 4.

It will be appreciated that in a manner similar to the one described above with reference to FIGS. 6 and 7 the level of commitment evaluator 325 may determine the level of user's interest in a particular item category available via the transaction facility 125.

Methodology: User-Interface and User Preferences

FIG. 9 illustrates a user interface display 900 that may be presented to the user who lost a particular auction session according to one embodiment of the present invention. The user interface may comprise a recommendation list of items that may be of interest to the user. The user interface display 900 may be divided into three sections 910, 930 and 950. In one embodiment section 910 is a table comprising information about items that are offered for sale by the seller who listed the auction session that the user lost. Section 910 contains an item # field 911 listing the number of items available via the transaction facility 125 and offered by the same seller. An end of date field 912 lists the time at which the auction of the particular item will terminate. The price of the item may be listed in a price field 913. An item title field 914 may comprise the title of the item.

In one embodiment the section 930 of the user interface display 900 may be a table containing items that are similar to the original item and that are offered by sellers other than the one of the original item. The table may contain an item # field 931 listing the number of items available via the transaction facility 125. An item title field 932 may contain the title of the item. The price of the item may be listed in a price field 933. A bids field 934 may contain the number representing the total number of bids placed by other users on the particular item. The end of the auction session may be listed in an end date field 935.

In one embodiment the section 950 of the user interface display 900 may be a table containing items that are similar to the original item and that are offered via other facilities linked to the transaction facility. For example, in one embodiment the transaction facility 125 may be part of a commerce facility offering items for sale at a fixed, non negotiable, price. In this embodiment, the recommendation engine may generate a list of items that are similar to the original items by searching the fixed price items table (not shown) of database 245 of FIG. 2 for items with descriptions containing keywords retrieved from the original item description. The table of the section 950 may contain an item title field 951 listing the title of a similar item. The price of the item may be listed in a price field 952 and information about availability of the item may be listed in the in stock field 953. In one embodiment the field 953 indicates the total number of items available in stock at the current time. In another embodiment the field 953 may specify the length of time required to obtain an item ready for shipment to the user if the item is not currently in stock.

In one embodiment if the recommendation engine did not locate similar items to be displayed in a particular section of the user interface display 900, that section may be displayed containing a table with empty fields. In another embodiment that section may display a message indicating that none of the similar items were found. Yet, in another embodiment that section may contain no graphical data.

In one embodiment the user may be presented with the user interface display via an email message. The body of the email message contains user interface display 900. The item number field of tables of the Sections 910 and 930 may contain item numbers constituting links to a web page containing detailed information about the items. The item title field of the table displayed in section 950 may contain a link to the web page displaying detailed information about the particular item.

In one embodiment, the user may be presented with the recommendation list via an email message containing a link to a web page comprising the user interface display 900.

In another embodiment, the user may be presented with the recommendation list in the form of the user interface display 900 upon the next log in session to the transaction facility 125.

In one embodiment, the users of the transaction facility 125 of FIG. 1 may specify whether they would like to utilize the generation of the recommendation lists feature of the transaction facility 125. In one embodiment, at 810 of FIG. 8A the transaction facility 125 may present the sellers offering goods or services via the transaction facility 125 with a graphical interface 1000 illustrated in FIG. 10. The graphical interface 1000 comprises two check boxes, a "Yes" check box 1010 and a "No" check box 1015. The graphical interface 1000 comprises an explanation of checkboxes 1010 and 1015 in order to allow the seller to make an informed decision prior to selecting a checkbox. At 820 the seller selects a check box, Selection of the checkbox 1010 indicates that the seller prefers the unsuccessful bidders to be notified that they lost a particular auction session and be informed of other auctions of similarly titled items offered either by the seller or by other users of the transaction facility 125. In addition, other items that the seller offers via the transaction facility 125 may be included into the recommendation lists for users who did not bid on the seller's services or goods. Selection of the checkbox 1015 indicates that the seller prefers the unsuccessful bidders to not be presented with the links to the seller's other auctions. Moreover, the selection of the checkbox 1015 indicates that the seller prefers not to have his/her items be included in any recommendation lists generated by the recommendation engine 325.

In one embodiment of the present invention, the seller may specify his/her preferences upon creating an account with the transaction facility 125. In another embodiment, the seller may be presented with an option to specify his/her preferences every time the seller decides to offer an item for sale via the transaction facility 125.

Figure 8:
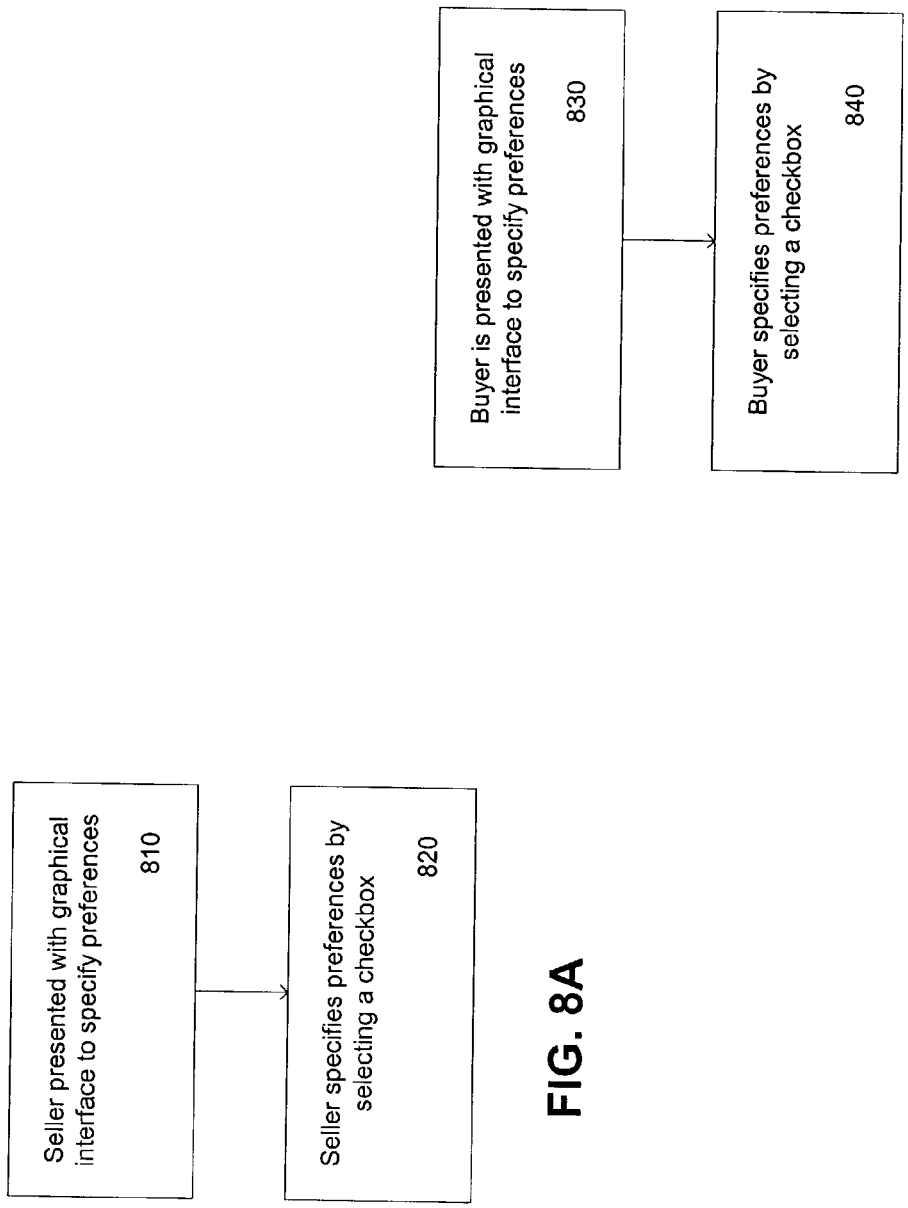
FIG. 8A is a flow diagram of a specification of seller preferences process according to one embodiment of the present invention.
FIG. 8B is a flow diagram of a specification of buyer preferences process according to one embodiment of the present invention.

At 830 of FIG. 8B a buyer may also be presented with a graphical interface 1100 illustrated in FIG. 11 according to one embodiment of the present invention. The graphical interface 1100 contains two checkboxes, checkbox 1110 and checkbox 1115. At 840 the buyer selects a checkbox by clicking on it. Selection of the checkbox 1110 indicates that the buyer prefers to receive a notification of a termination of an auction session that the buyer did not win. In addition, the selection of the checkbox 1110 indicates that the buyer prefers to receive a recommendation list comprising items with similar titles than the one the buyer could not purchase. Selection of the checkbox 1115 indicates that the buyer prefers not to receive notification of a termination of an auction session that the buyer did not win along with recommendation lists of items with similar titles.

In one embodiment the buyer may specify his/her preferences utilizing the graphical interface 1100 when creating an account with the transaction facility 125. In another embodiment the buyer may be presented with the graphical interface 1100 upon placing a bid on a particular item offered via the transaction facility 125. Yet, in another embodiment the buyer may be presented with the link to the graphical user interface in an email message indicating that the buyer is the current high bidder on a particular item.

Computer System

Figure 12:
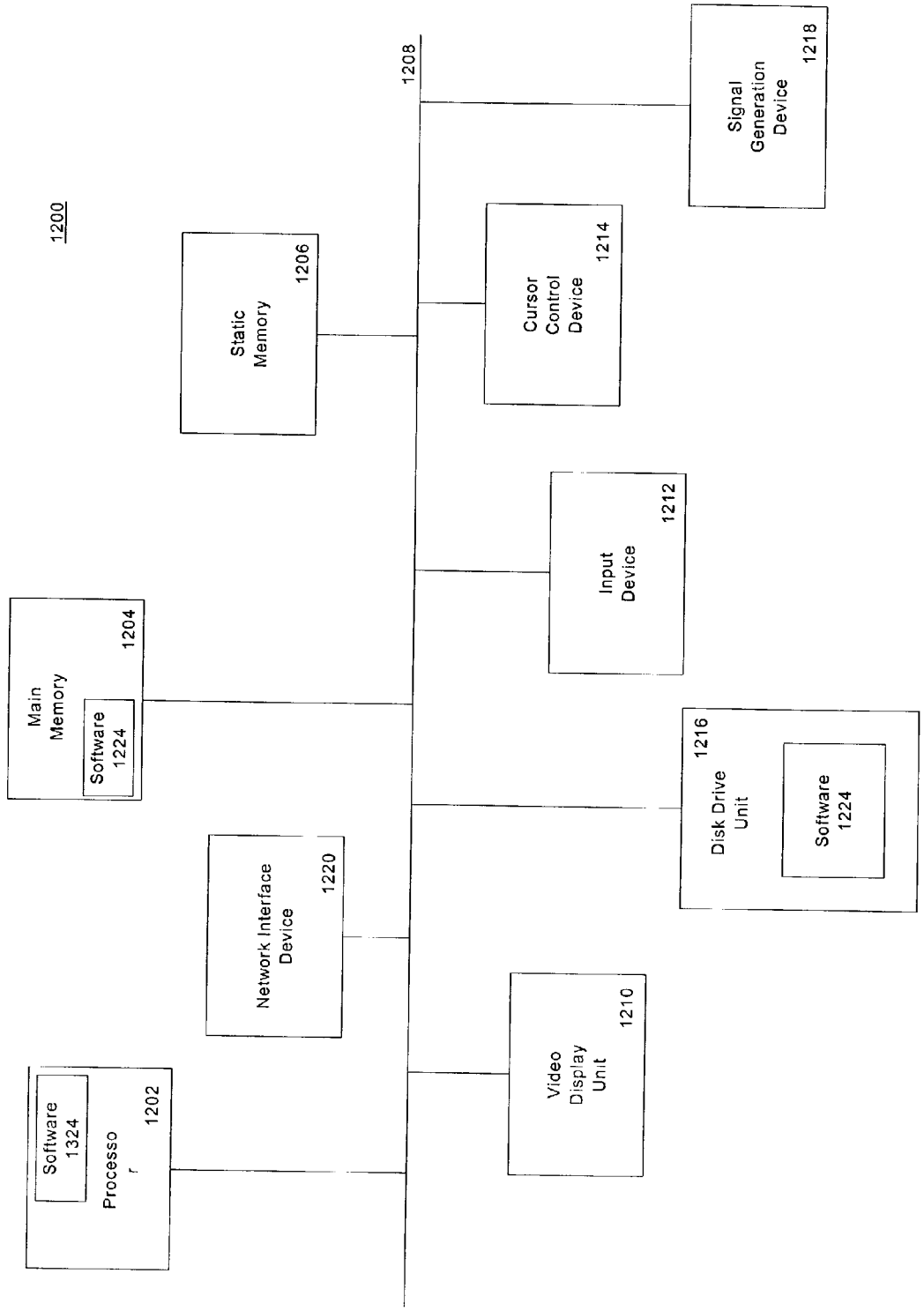
FIG. 12 illustrates a computer system according to one embodiment of the present invention.

FIG. 12 shows a diagrammatic representation of machine in the exemplary form of a computer system 1200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored a set of instructions (i.e., software) 1224 embodying any one, or all, of the methodologies described above. The software 1224 is also shown to reside, completely or at least partially, within the main memory 1204 and/or within the processor 1202. The software 1224 may further be transmitted or received via the network interface device 1220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
    determining that a user of a network-based transaction facility unsuccessfully attempted to purchase a first item presented by the network-based transaction facility,
       the determining being performed by a processor of a machine and including determining that a transaction history of the user within the network-based transaction facility is shorter than required for purchasing the first item;
    accessing preference data that indicates a preference that a recommendation be communicated in response to an unsuccessful attempt to make a purchase; and
    communicating information descriptive of a second item to the user based on the determining that the user unsuccessfully attempted to purchase the first item and based on the preference data that indicates the preference that the recommendation be communicated in response to the unsuccessful attempt to make the purchase of the first item.

2. The method of claim 1, wherein:
    the preference data is generated by a seller of the first item;
    the preference that the recommendation be communicated is a preference of the seller that the recommendation be communicated to one or more users who unsuccessfully attempted to purchase from the seller; and
    the communicating of the information descriptive of the second item is responsive to the preference of the seller that the recommendation be communicated to the one or more users.

3. The method of claim 1, wherein:
    the preference data is generated by the user;
    the preference that the recommendation be communicated is a preference of the user that the recommendation be communicated to the user upon the unsuccessful attempt to make the purchase; and
    the communicating of the information descriptive of the second item is responsive to the preference of the user that the recommendation be communicated to the user.

4. The method of claim 1 further comprising:
    accessing an attribute of the first item; and
    identifying the second item based on the attribute of the first item.

5. The method of claim 4, wherein:
    the attribute of the first item includes a description of the first item.

6. The method of claim 4, wherein:
    the attribute of the first item includes a keyword descriptive of the first item.

7. The method of claim 4, wherein:
    the attribute of the first item includes a first category within which the first item is categorized by the network-based transaction facility.

8. The method of claim 7, wherein:
    the identifying of the second item is based on the first category within which the first item is categorized.

9. The method of claim 8 further comprising:
    identifying the second item as being categorized within the first category within which the first item is categorized.

10. The method of claim 8 further comprising:
    identifying the second item as being categorized within a second category that corresponds to the first category within a data structure of categories supported by the network-based transaction facility.

11. The method of claim 1, wherein:
    the determining that the user unsuccessfully attempted to purchase the first item includes determining that the user unsuccessfully bid on the first item.

12. The method of claim 1, wherein:
    the determining that the user unsuccessfully attempted to purchase the first item includes determining that a condition of making the purchase is unsatisfied.

13. The method of claim 1, wherein:
    the communicating of the information descriptive of the second item includes communicating a list of items that are similar to the first item.

14. The method of claim 1, wherein:
    the communicating of the list of items includes communicating a sublist of items offered by a seller of the first item and a sublist of items offered by a further seller.

15. The method of claim 1, wherein:
    the communicating of the information descriptive of the second item includes sending an email message.

16. A non-transitory machine-readable storage medium comprising instructions that, when executed by one or more processors of a machine, cause the machine to perform operations comprising:
    determining that a user of a network-based transaction facility unsuccessfully attempted to purchase a first item presented by the network-based transaction facility,
       the determining being performed by the one or more processors of the machine and including determining that a transaction history of the user within the network-based transaction facility is shorter than required for purchasing the first item;
    accessing preference data that indicates a preference that a recommendation be communicated in response to an unsuccessful attempt to make a purchase; and
    communicating information descriptive of a second item to the user based on the determining that the user unsuccessfully attempted to purchase the first item and based on the preference data that indicates the preference that the recommendation be communicated in response to the unsuccessful attempt to make the purchase of the first item.

17. The non-transitory machine-readable storage medium of claim 16, wherein:
    the determining that the user unsuccessfully attempted to purchase the first item includes determining that a condition of making the purchase is unsatisfied.

18. A system comprising:
    a transaction engine configured to determine that a user of a network-based transaction facility unsuccessfully attempted to purchase a first item presented by the network-based transaction facility,
       the determining being performed by a processor of a machine and including determining that a transaction history of the user within the network-based transaction facility is shorter than required for purchasing the first item;
    a database engine configured to access preference data that indicates a preference that a recommendation be communicated in response to an unsuccessful attempt to make a purchase; and
    a processor configured by a recommendation engine that configures the processor to communicate information descriptive of a second item to the user based on the determining that the user unsuccessfully attempted to purchase the first item and based on the preference data that indicates the preference that the recommendation be communicated in response to the unsuccessful attempt to make the purchase of the first item.

19. The system of claim 18, wherein:
the determining that the user unsuccessfully attempted to purchase the first item includes determining that a condition of making the purchase is unsatisfied.

* * * * *

UNITED STATES PATENT AND TRADEMARK OFFICE
CERTIFICATE OF CORRECTION

PATENT NO. : 8,275,673 B1
APPLICATION NO. : 10/263224
DATED : September 25, 2012
INVENTOR(S) : Poon et al.

It is certified that error appears in the above-identified patent and that said Letters Patent is hereby corrected as shown below:

On the Title Page, Item (56)

In column 2, under "Other Publications", line 1, delete "Asim et al.;" and insert --Asim, et al.,--, therefor In column 2, under "Other Publications", line 2, delete "v37n3pg363" and insert --vol. 37, Iss. 3, pg. 363,--, therefor In column 2, under "Other Publications", line 2, delete "13pgs." and insert --13 pgs.--, therefor On page 2, in column 2, under "Other Publications", line 1, delete "Brian;" and insert --Brian,--, therefor On page 2, in column 2, under "Other Publications", line 2, delete "v42i8pg21" and insert --vol. 42, Iss. 8., pg. 21--, therefor On page 2, in column 2, under "Other Publications", line 8, delete "L ," and insert --L.,--, therefor On page 2, in column 2, under "Other Publications", line 11, delete "M ," and insert --M.,--, therefor On page 2, in column 2, under "Other Publications", line 14, delete "J. ," and insert --J.,--, therefor On page 2, in column 2, under "Other Publications", line 17, delete "R ," and insert --R.,--, therefor On page 2, in column 2, under "Other Publications", line 21, delete "S W.," and insert --S. W.,--, therefor On page 2, in column 2, under "Other Publications", line 23, delete "Wxpert" and insert --Expert--, therefor Signed and Sealed this
Twenty-fifth Day of November, 2014

Michelle K. Lee
*Deputy Director of the United States Patent and Trademark Office*

On page 2, in column 2, under "Other Publications", line 25, delete "N. ," and insert --N.,-- therefor On page 2, in column 2, under "Other Publications", line 30, delete "M. ," and insert --M.,-- therefor On page 2, in column 2, under "Other Publications", line 32, delete "Moira ," and insert --Moira,-- therefor On page 2, in column 2, under "Other Publications", line 33, delete "v18n7," and insert --vol. 18, Iss. 7,-- therefor On page 2, in column 2, under "Other Publications", line 33, after "2001", insert --,-- therefor On page 2, in column 2, under "Other Publications", line 34, delete "A. ," and insert --A.,-- therefor On page 3, in column 1, under "Other Publications", line 1, delete "Y. ," and insert --Y.,-- therefor On page 3, in column 1, under "Other Publications", line 2, delete "Compute" and insert --computing--, therefor On page 3, in column 1, under "Other Publications", line 2, delete "PP. p." and insert --pp.-- therefor On page 3, in column 1, under "Other Publications", line 6, delete "L," and insert --L.,-- therefor On page 3, in column 1, under "Other Publications", line 10, delete "Y ," and insert --Y.,-- therefor On page 3, in column 1, under "Other Publications", line 11, delete "Wlectronic" and insert --Electronic--, therefor On page 3, in column 1, under "Other Publications", line 13, delete "Y," and insert --Y.,-- therefor On page 3, in column 1, under "Other Publications", line 18, delete "v14n3," and insert --vol. 14, Iss. 3,-- therefor On page 3, in column 1, under "Other Publications", line 19, delete "Chun ," and insert --Chun,-- therefor On page 3, in column 1, under "Other Publications", line 22, delete "H ," and insert --H.,-- therefor On page 3, in column 1, under "Other Publications", line 24, delete "G. ," and insert --G.,-- therefor On page 3, in column 1, under "Other Publications", line 27, delete "B ," and insert --B.,-- therefor On page 3, in column 1, under "Other Publications", line 30, delete "A. ," and insert --A.,-- therefor On page 3, in column 1, under "Other Publications", line 33, delete "P. ," and insert --P.,-- therefor On page 3, in column 1, under "Other Publications", line 38, delete "M ," and insert --M.,--, therefor On page 3, in column 1, under "Other Publications", line 40, delete "Yu ," and insert --Yu.,--, therefor On page 3, in column 1, under "Other Publications", line 43, delete "245,." and insert --245.--, therefor On page 3, in column 1, under "Other Publications", line 44, delete "W ," and insert --W.,--, therefor On page 3, in column 1, under "Other Publications", line 46, delete "N. ," and insert --N.,--, therefor On page 3, in column 1, under "Other Publications", line 49, delete "P. ," and insert --P.,--, therefor On page 3, in column 1, under "Other Publications", line 52, delete "N ," and insert --N.,--, therefor On page 3, in column 1, under "Other Publications", line 53, delete "Vol." and insert --vol.--, therefor On page 3, in column 1, under "Other Publications", line 54, delete "D. ," and insert --D.,--, therefor On page 3, in column 1, under "Other Publications", line 61, delete "P. ," and insert --P.,--, therefor On page 3, in column 1, under "Other Publications", line 64, delete "D ," and insert --D.,--, therefor On page 3, in column 1, under "Other Publications", line 71, delete "B. ," and insert --B.,--, therefor On page 3, in column 2, under "Other Publications", line 1, delete "B. ," and insert --B.,--, therefor On page 3, in column 2, under "Other Publications", line 4, delete "J B.," and insert --J. B.,--, therefor On page 3, in column 2, under "Other Publications", line 10, delete "B. ," and insert --B.,--, therefor On page 3, in column 2, under "Other Publications", line 13, delete "A. ," and insert --A.,--, therefor On page 3, in column 2, under "Other Publications", line 16, delete "P ," and insert --P.,--, therefor On page 3, in column 2, under "Other Publications", line 22, delete "J. ," and insert --J.,--, therefor On page 3, in column 2, under "Other Publications", line 26, delete "B ," and insert --B.,--, therefor On page 3, in column 2, under "Other Publications", line 29, delete "T. ," and insert --T.,--, therefor On page 3, in column 2, under "Other Publications", line 34, delete "Lin ," and insert --Lin,--, therefor On page 3, in column 2, under "Other Publications", line 37, delete "C. ," and insert --C.,--, therefor On page 3, in column 2, under "Other Publications", line 37, delete "InformationWEEK" and insert --Information Week--, therefor On page 3, in column 2, under "Other Publications", line 39, delete "Chien ," and insert --Chien,--, therefor On page 3, in column 2, under "Other Publications", line 53, delete "2001),1766-1770." and insert --2001), 1766-1770.--, therefor On page 3, in column 2, under "Other Publications", line 56, delete "Moorcysle" and insert --Motorcycle--, therefor On page 3, in column 2, under "Other Publications", line 58, after "Se", insert --,--, therefor On page 3, in column 2, under "Other Publications", line 63, delete "html,(Printed" and insert --html, (Printed--, therefor On page 3, in column 2, under "Other Publications", line 66, delete "(2002),83-105." and insert --(2002), 83-105.--, therefor On page 3, in column 2, under "Other Publications", line 69, delete "Issue,(1998)" and insert --Issue, (1998)--, therefor On page 3, in column 2, under "Other Publications", line 70, after "David", insert --,--, therefor On page 3, in column 2, under "Other Publications", line 71, delete "Ststems" and insert --systems--, therefor On page 3, in column 2, under "Other Publications", line 73, delete "(AAA1-2000),6 pgs." and insert --(AAA1-2000), 6 pgs.--, therefor On page 4, in column 1, under "Other Publications", line 3, delete "C ," and insert --C.,--, therefor On page 4, in column 1, under "Other Publications", line 13, delete "Finai" and insert --Final--, therefor On page 4, in column 1, under "Other Publications", line 17, delete "Filed" and insert --filed--, therefor On page 4, in column 1, under "Other Publications", line 52, delete "mailed" and insert --filed--, therefor On page 4, in column 1, under "Other Publications", line 64, delete "mailed" and insert --filed--, therefor On page 4, in column 2, under "Other Publications", line 5, delete "10,689,970," and insert --10/689,970,--, therefor On page 4, in column 2, under "Other Publications", line 18, after "10/877,806", insert --,--, therefor On page 4, in column 2, under "Other Publications", line 23, before "3 pgs.", delete "Advisory Action,", therefor On page 5, in column 2, under "Other Publications", line 10, delete "Filed" and insert --filed--, therefor In the Drawings On Sheet 2 of 13, in figure 2, reference numeral (245), after "items table", delete "245" and insert --250--, therefor On Sheet 11 of 13, in figure 10, reference numeral (1100), delete "1100" and insert --1000--, therefor On Sheet 12 of 13, in figure 11, reference numeral (1000), delete "1000" and insert --1100--, therefor On Sheet 13 of 13, in figure 12, reference numeral (1324), delete "1324" and insert --1224--, therefor On Sheet 13 of 13, in figure 12, reference numeral (1202), line 1, delete "Processo" and insert --Processor--, therefor In the Specification In column 3, line 14, delete "corn" and insert --com--, therefor In column 4, line 14, delete "an auction" and insert --a transaction--, therefor In column 8, line 8, delete "715" and insert --720--, therefor In column 8, line 28, delete "325" and insert --315--, therefor In column 9, line 43, delete "box," and insert --box.--, therefor